(12) United States Patent
Endo

(10) Patent No.: US 7,623,718 B2
(45) Date of Patent: Nov. 24, 2009

(54) DATA PROCESSING APPARATUS AND CONTROL METHOD THEREOF

(75) Inventor: Yoshiyuki Endo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 11/223,256

(22) Filed: Sep. 9, 2005

(65) Prior Publication Data

US 2006/0056712 A1    Mar. 16, 2006

(30) Foreign Application Priority Data

Sep. 10, 2004  (JP)  ............................. 2004-264595
Jul. 21, 2005  (JP)  ............................. 2005-211532

(51) Int. Cl.
    *G06K 9/36*    (2006.01)
(52) U.S. Cl. .................................................. 382/232
(58) Field of Classification Search ......... 382/232–233, 382/235–236, 238–240, 244–253; 348/391.1, 348/394.1–396.1, 400.1–404.1, 408.1–416.1, 348/420.1–421.1, 430.1–431.1; 375/240.12–240.26
    See application file for complete search history.

(56) References Cited

U.S. PATENT DOCUMENTS

| 5,666,487 | A | * | 9/1997 | Goodman et al. ........... 709/246 |
| 5,793,427 | A | * | 8/1998 | Mills et al. ................ 348/391.1 |
| 6,125,201 | A |   | 9/2000 | Zador |
| 6,636,222 | B1 | * | 10/2003 | Valmiki et al. .............. 345/505 |
| 6,748,020 | B1 | * | 6/2004 | Eifrig et al. ............ 375/240.26 |
| 6,782,132 | B1 | * | 8/2004 | Fogg .......................... 382/232 |
| 2002/0152317 | A1 | | 10/2002 | Wang et al. |
| 2003/0035653 | A1 | | 2/2003 | Lyon et al. |
| 2003/0072372 | A1 | | 4/2003 | Shen et al. |
| 2004/0032348 | A1 | | 2/2004 | Lai et al. |
| 2004/0105107 | A1 | | 6/2004 | Takahashi |

FOREIGN PATENT DOCUMENTS

| CN | 1484447 | 3/2004 |
| JP | 2001-197458 | 7/2001 |
| JP | 2003-319364 | 11/2003 |
| JP | 2004-151167 | 5/2004 |
| WO | 01/69936 A2 | 9/2001 |

OTHER PUBLICATIONS

Youn et al, "Video transcoding for multiple clients", Proceedings of SPIE vol. 4067 (2000), pp. 76-85.
European Search Report dated Jan. 31, 2006.
Extended European Search Report dated Feb. 8, 2006.
First Office Action dated May 11, 2007 for Chinese counterpart application No. 2005101024485 (with English translation).

* cited by examiner

*Primary Examiner*—Jose L Couso
(74) *Attorney, Agent, or Firm*—Cowan, Liebowitz & Latman, P.C.

(57) ABSTRACT

A data processing apparatus includes a plurality of image processing units which execute different processes on input image data and an encoding unit which encodes the image data. A generation unit selects an image processing unit to be used from among a plurality of image processing units based on requests from a plurality of output destinations to process image data of each frame input. The selected image processing unit processes the image data in time-series and the encoding unit encodes the processed image data. Thus, a plurality of image data corresponding to requests from a plurality of output destinations are generated.

36 Claims, 19 Drawing Sheets

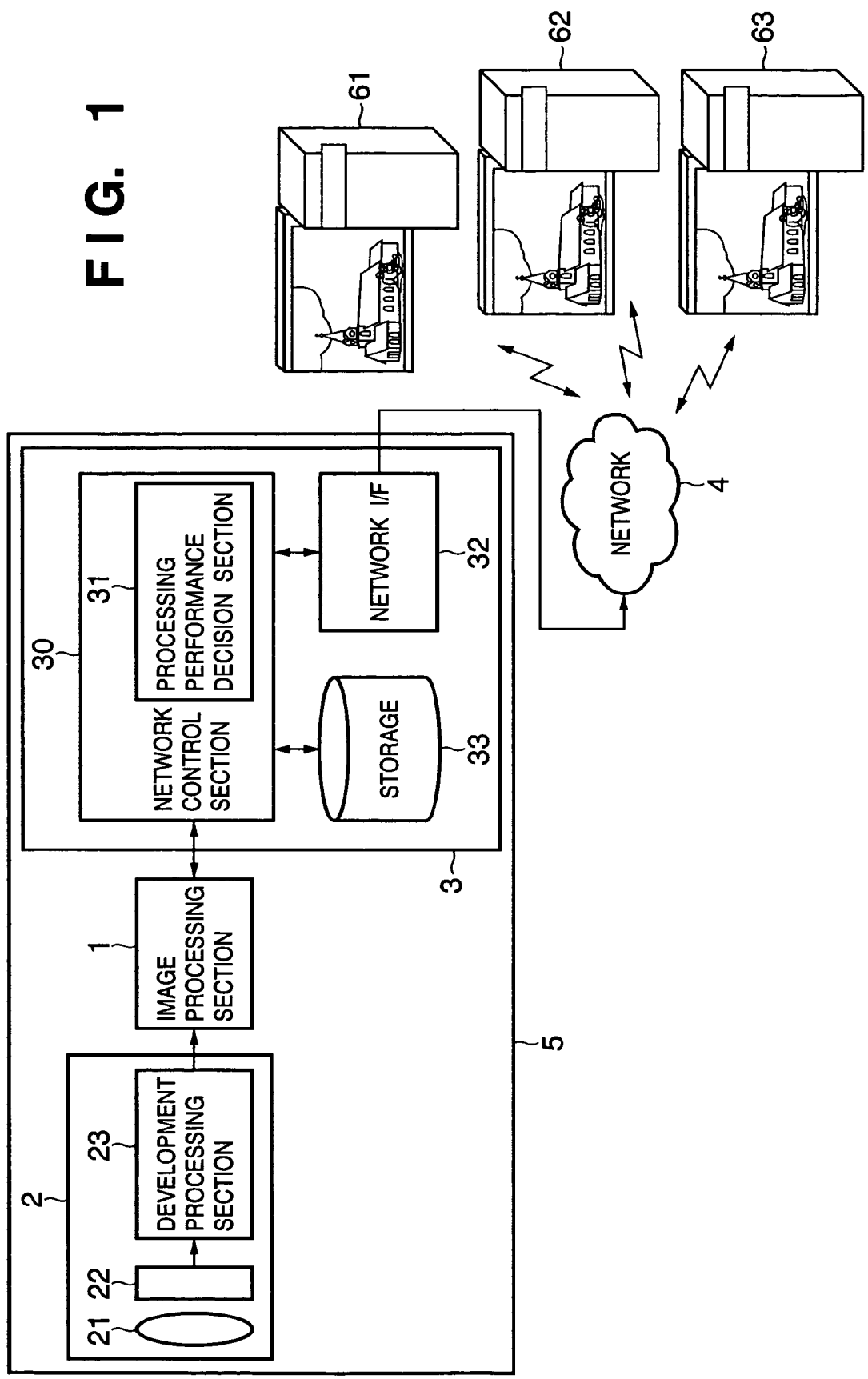

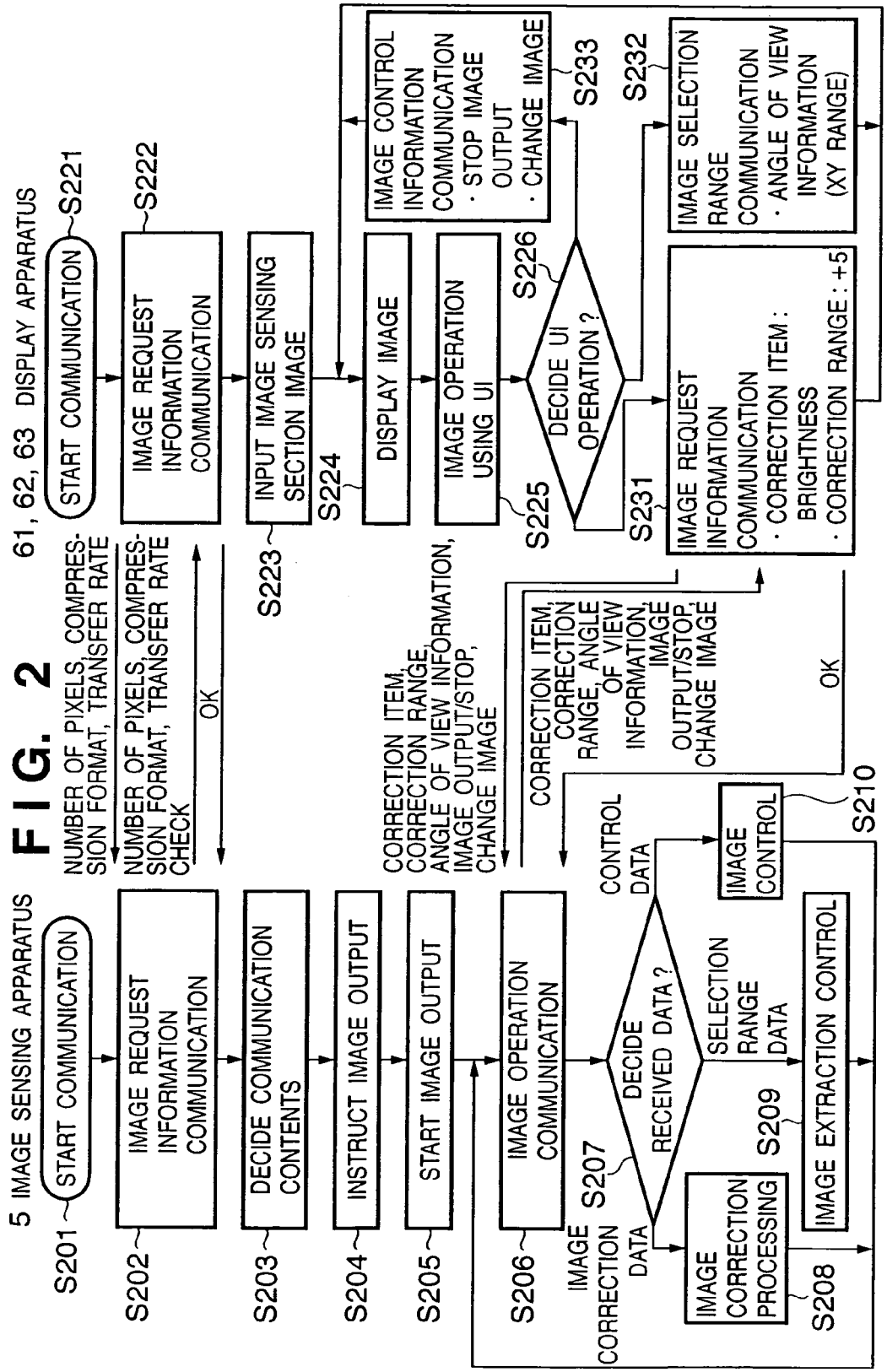

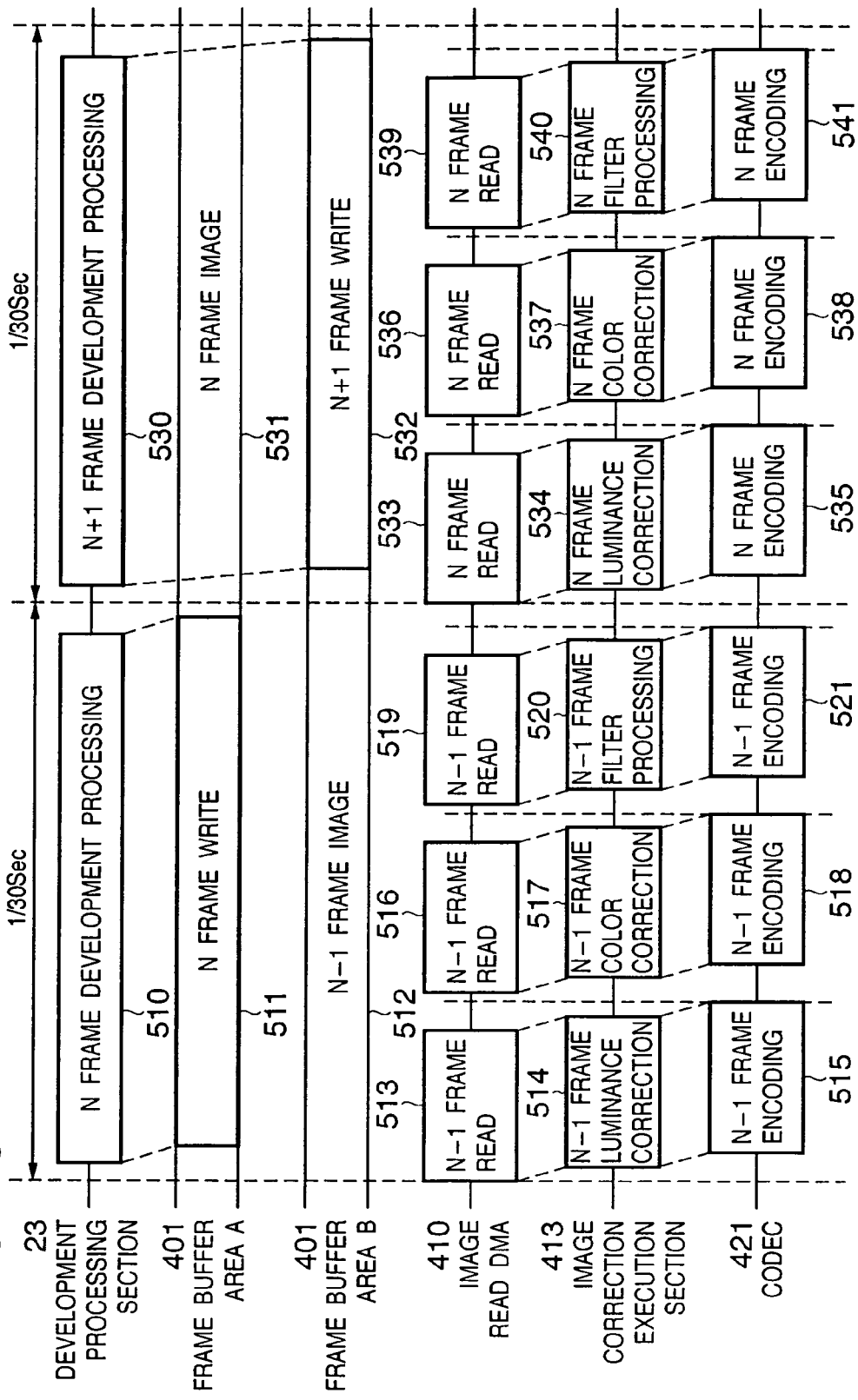

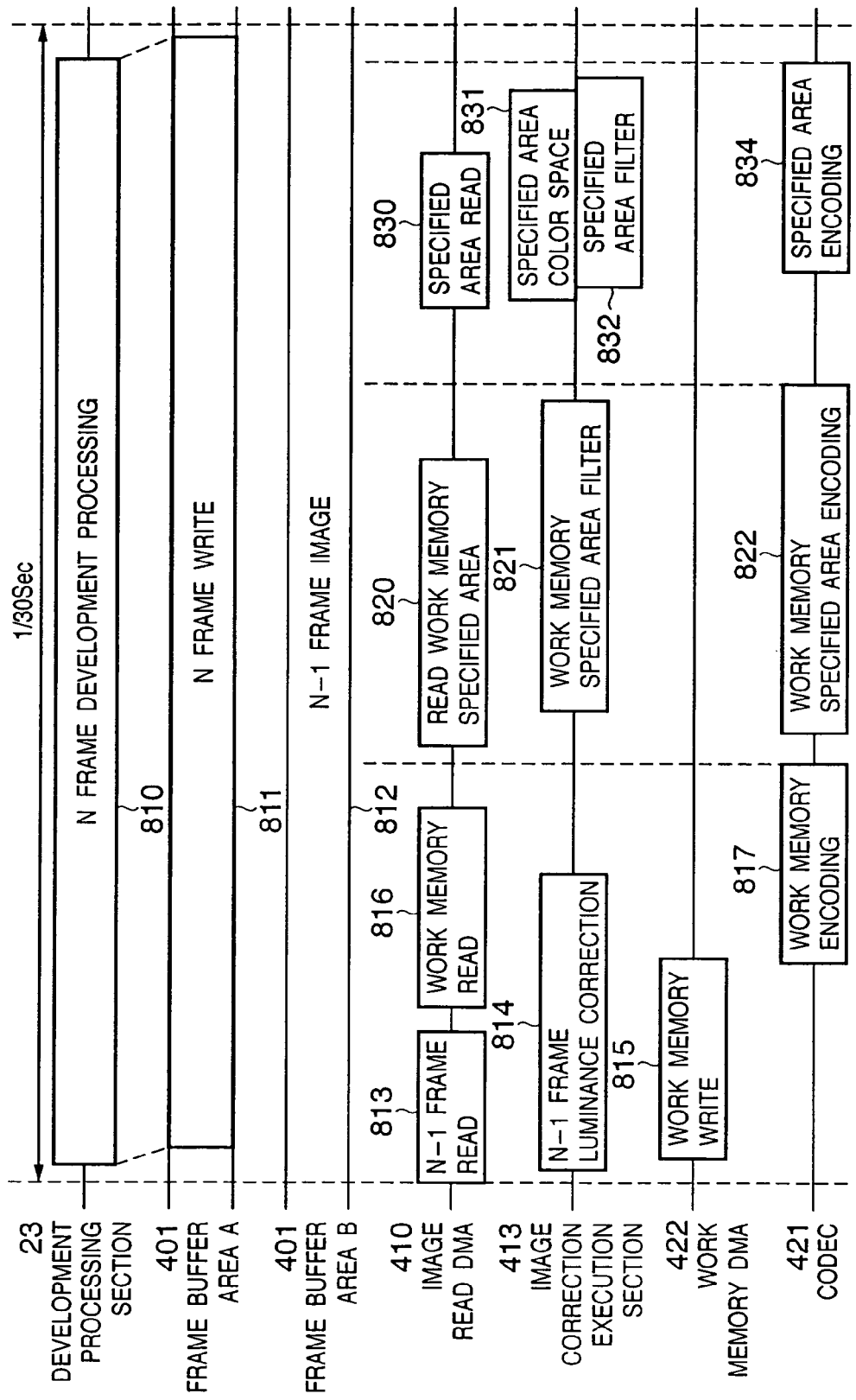

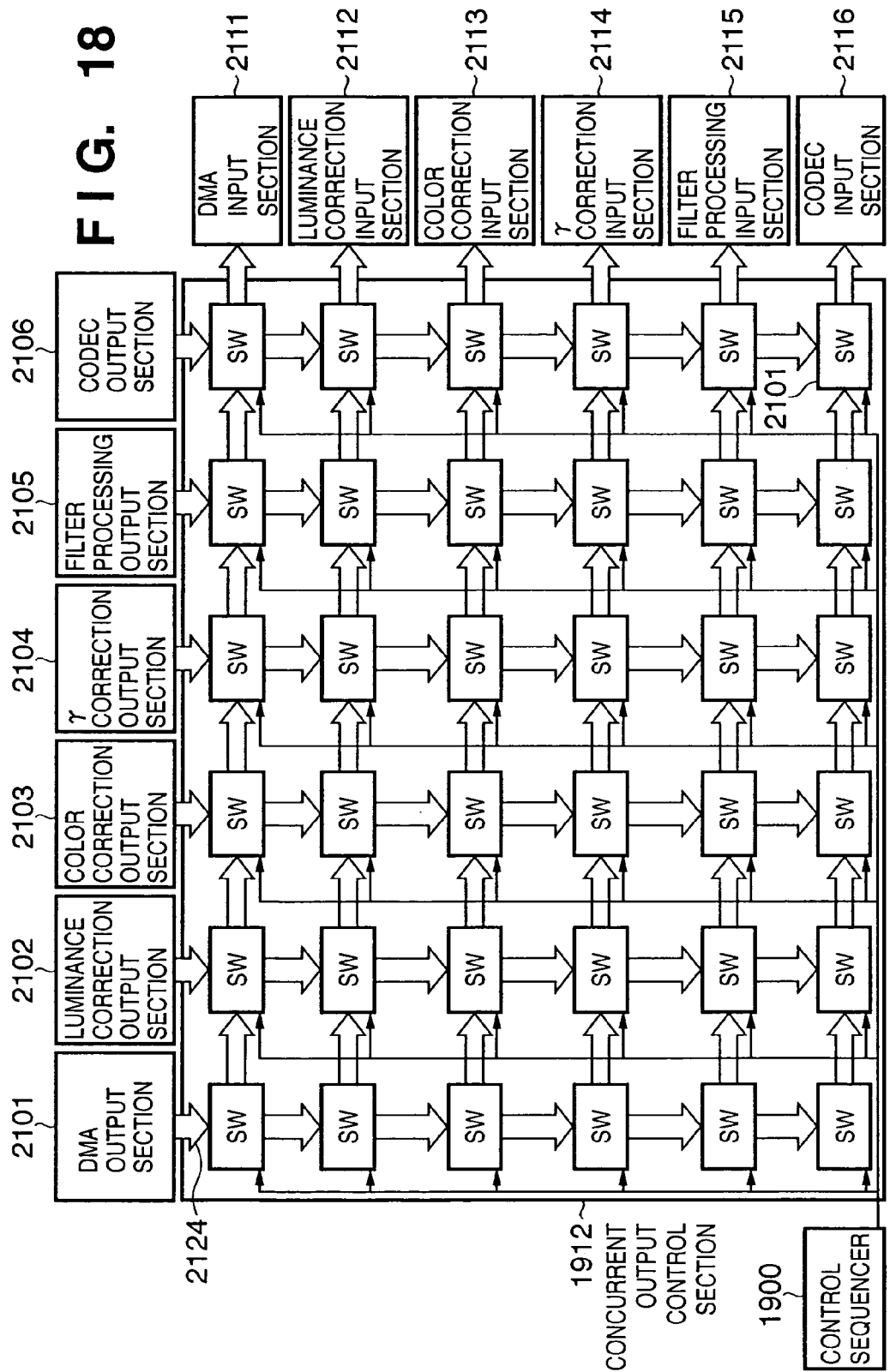

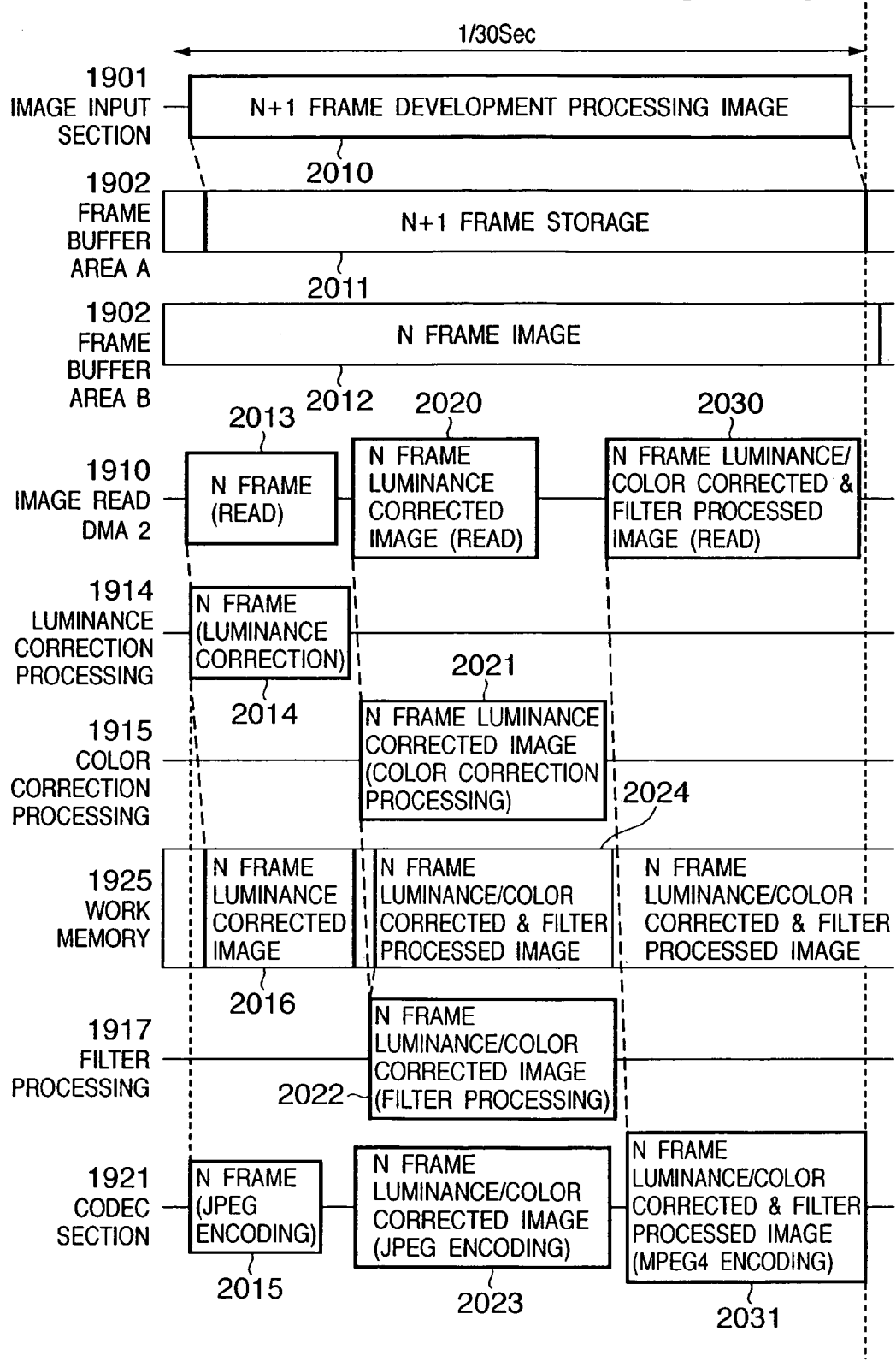

DATA PROCESSING APPARATUS AND CONTROL METHOD THEREOF

FIELD OF THE INVENTION

The present invention relates to video data processing, and more particularly, to a data processing apparatus and a control method thereof preferably applicable to image transmission over a network.

BACKGROUND OF THE INVENTION

With the widespread use of the Internet, information is commonly transmitted via WWW (World Wide Web), etc., in recent years. Under such a circumstance, an image sensing apparatus has emerged which has functions of taking images in real time and delivering the images over a network.

On the other hand, when a camera image delivery service is provided for a user over a network, there is a proposal on a delivery of image data suitable for an environment on the user side.

Japanese Patent Laid-Open No. 2001-197458 describes an image processing apparatus in which information (amount of γ correction) specific to a display (CRT, LCD, etc., as a PC monitor) for an image display on the user side is transmitted to a camera and the camera processes and delivers a taken image based on the information. Japanese Patent Laid-Open No. 2001-197458 is intended to display an image estimated to be most preferable for the display to display an image on the user side.

Furthermore, Japanese Patent Laid-Open No. 2004-151167 describes a server which receives information obtained by measuring a luminance characteristic specific to a display (display of a cellular phone) for each display, carries out an image correction according to the characteristic of each display (display of a cellular phone) and then carries out delivery processing.

Furthermore, a video delivery apparatus described in Japanese Patent Laid-Open No. 2003-319364 stores images taken by a camera in a specific image generation server once. The video delivery apparatus delivers motion images extracted at angles of view requested by a plurality of users who access a specific WEB server via the Internet to the users via the WEB server.

The structure described in Japanese Patent Laid-Open No. 2001-197458 is designed to transmit information specific to a display of a delivery destination to a camera side and reflect the information when taking images using the camera. However, when a plurality of users access one camera, such a structure can only meet a request from a user who has first priority. That is, users who do not have the first priority only view images manipulated by the user who has the first priority and have to display image data adapted to the display of the user who has the first priority.

To meet requests from a plurality of users for concurrent image taking, a structure having a plurality of image processing sections may be conceived. However, in such a case, the contents that can be serviced may be restricted by the number of such processing units. Increasing the number of processing units eases the restrictions. However, a network camera server, etc., which assumes the function on the image-taking side of a video delivery system is generally required to be smaller in size and the number of processing units that can be mounted therein is limited to the areas of the substrate/chip or heat value, etc. For that reason, there is a problem that the number of such processing units is actually limited.

Furthermore, as the case with the technology described in Japanese Patent Laid-Open No. 2003-319364, according to the structure whereby an image of a camera is stored in a server and then the image is processed according to the user's request and transmitted, the image is delivered after being stored and subjected to predetermined processing. For this reason, there is a problem that a considerable difference is produced between the time at which the image is taken and the time at which the image is reproduced. This problem is serious in the case where motion images are taken and those motion images are used at remote places for monitoring purposes, etc., at a plurality of locations with primary importance placed on the real-time nature by a plurality of users. Meeting such purposes requires a system that subjects non-encoded images consisting of 30 frames per sec entering from the image sensing apparatus to processing according to a plurality of requests in a non-encoded state, then encodes the images individually in their respective formats requested and transmits the images. Therefore, the number of users to whom the images can be delivered simultaneously is significantly limited.

On the other hand, it is possible to consider a structure in which images output from a camera are subjected to some irreversible encoding processing and stored in a server, or images delivered from a camera as analog images are converted to digital signals and stored in the server. However, according to such a structure, images obtained by reading encoded data from the server and decoding the data or images subjected to digital to analog conversion and then analog to digital conversion are processed. For this reason, there is a problem that image quality obviously deteriorates compared to a case where non-encoded or non-converted images are processed.

Furthermore, the technology described in Japanese Patent Laid-Open No. 2004-151167 is limited to a case where a limited display device (LCD) such as a cellular phone is used, and cannot be applied to an unspecified majority of types of displays.

SUMMARY OF THE INVENTION

The present invention has been implemented in view of the above described problems and it is an object of the present invention to allow motion images subjected to image processing according to requests from a plurality of display apparatuses to be transmitted to the respective apparatuses in real time and with only a low-level delay without increasing the sizes of the apparatuses.

A data processing apparatus according to an aspect of the present invention to attain the above described object has the following structure. That is, a data processing apparatus according to one aspect of the present invention comprises: a plurality of image processing means for executing different processes on input image data; encoding means for encoding the image data; and generation means for causing image processing means selected from among the plurality of image processing means based on requests from a plurality of output destinations to process the input image data of each frame in time-series and causing the encoding means to encode the processed image data to thereby generate a plurality of image data that meet the requests from the plurality of output destinations.

Furthermore, a data processing apparatus according to another aspect of the present invention to attain the above described object has the following structure. That is, a data processing apparatus according to one aspect of the present invention comprising: a plurality of image processing means for executing different processes on input image data; encoding means for encoding the image data; concurrent output means capable of concurrently supplying the same image data to the plurality of image processing means and the encoding means; and generation means for causing the concurrent output means to supply the input image data of each frame to image processing means selected from among the plurality of image processing means based on requests from a plurality of output destinations and said encoding means simultaneously so as to carry out image processing and encoding processing on the same data simultaneously and in time-series to generate a plurality of image data that meet the requests from the plurality of output destinations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 illustrates a hardware structure of an image sensing apparatus and a system structure according to a First Embodiment;

FIG. 2 is a flow chart showing operations of the image sensing apparatus and display apparatus according to the First Embodiment;

FIG. 5 illustrates internal operations of the respective processing sections of the image processing section according to the First Embodiment;

FIG. 6 illustrates internal operations of the respective processing sections of the image processing section according to a Second Embodiment;

FIG. 18 is a block diagram showing details of a concurrent output control section according to the Seventh Embodiment; and FIG. 19 illustrates internal operations of various processing sections of the image processing section according to the Seventh Embodiment.

DETAILED DESCRIPTION OF THE PREFERRED EMBODIMENTS

Figure 3A:
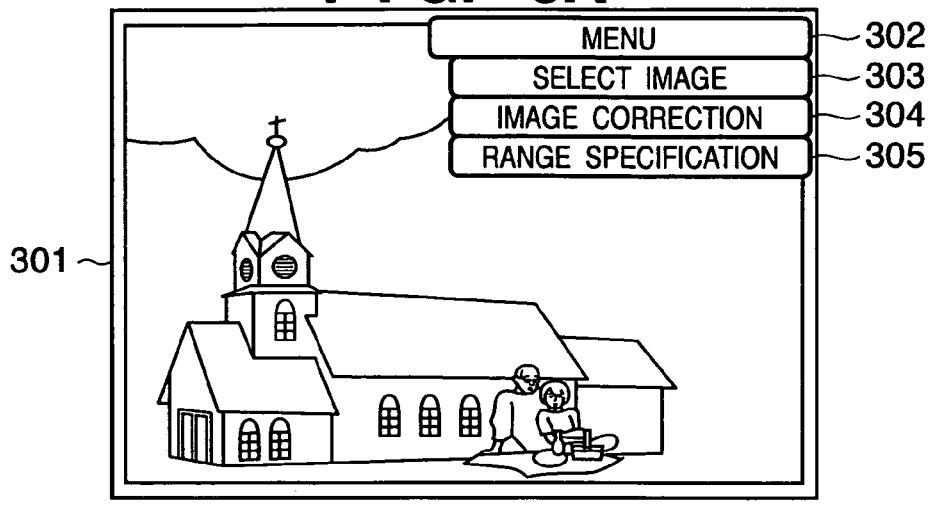
FIGS. 3A to 3C illustrate display examples of a display apparatus that can be connected to a network according to the First Embodiment.

Preferred embodiments of the present invention will now be described in detail in accordance with the accompanying drawings.

First Embodiment

FIG. 1 is a block diagram showing the structure of an image sensing apparatus according to a First Embodiment. In FIG. 1, an image sensing apparatus 5 is roughly divided into three components; an image processing section 1, an image sensing section 2 and a communication section 3. The image sensing section 2 includes a lens 21 to which image is input, a photoelectric conversion sensor (hereinafter referred to as "sensor") 22 which converts the light condensed by the lens 21 to an electric signal and a development processing section 23 which develops the signal obtained from the sensor 22. The development processing section 23 carries out luminance/color signal separation processing, noise reduction processing, reference γ correction processing and color correction/color signal suppression processing on the data (data of each of RGB elements in the case of a primary color filter) output from the sensor 22. Final output data of the image data output from the development processing section 23 becomes 4:2:2 YC data. The signal developed by the development processing section 23 is given to the image processing section 1 as image data. The image processing section 1 converts the image data to encoded data through various types of image processing, encoding processing and gives the encoded data to the communication section 3.

In the communication section 3 which realizes a network communication, a processing performance decision section 31 analyzes requests for the image sensing apparatus 5 from display apparatuses 61, 62, 63 connected via network and transmits processing information to the image processing section 1 and image sensing section 2.

Figure 4:
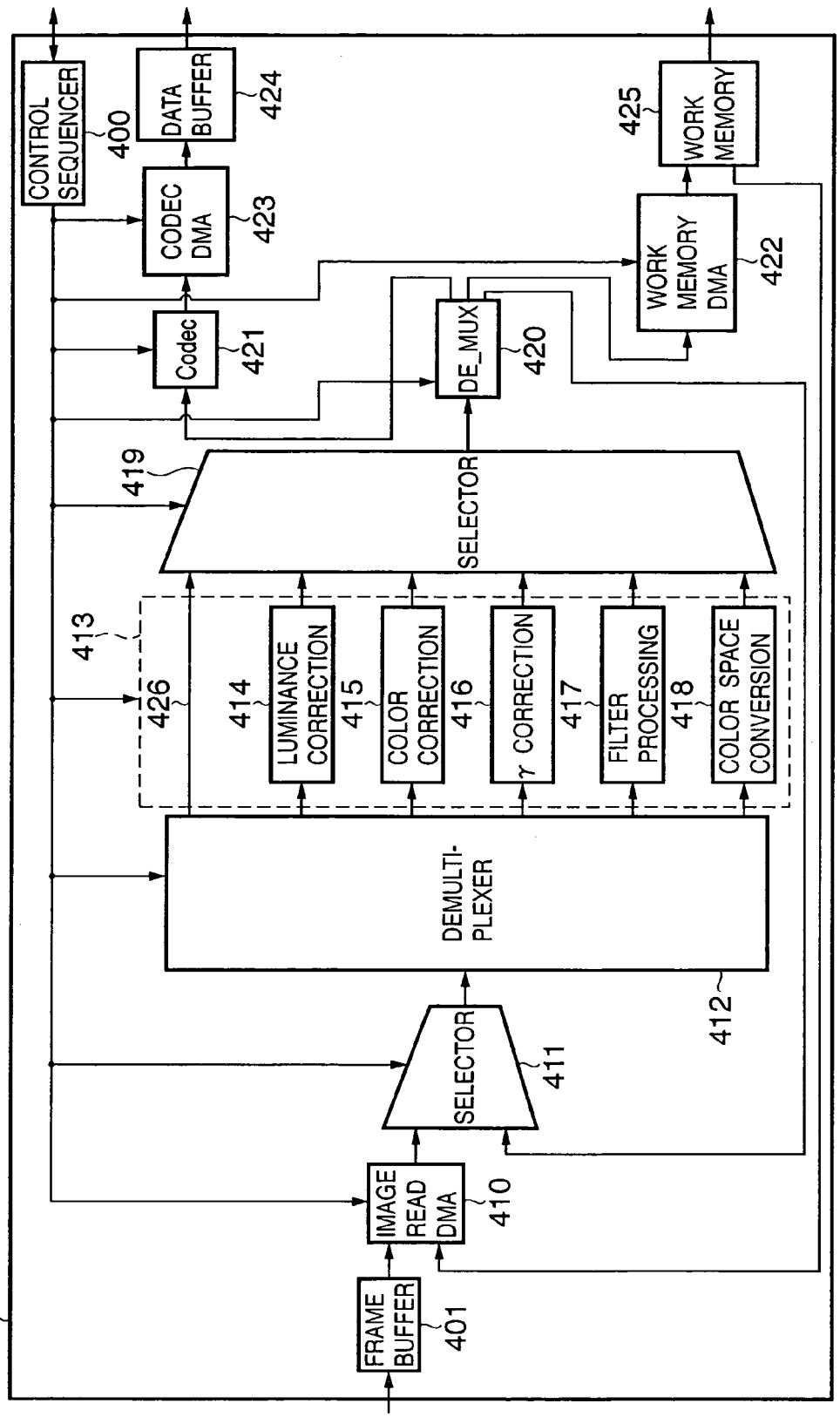
FIG. 4 is a block diagram showing details of an image processing section according to the First Embodiment.

Based on the above described processing information, the image processing section 1 stores motion image data encoded for the respective display apparatuses in a data buffer 424 (FIG. 4). The network control section 30 carries out processing such as packetizing the motion image encoded data input to the data buffer 424 according to the mode of a network at the destination and hands it over to a network interface section 32 as transmission data. The network interface section 32 sends data to a network 4 in a mode corresponding to the mode of the network. Furthermore, the communication section 3 is also provided with a storage section 33 for storing a motion image output from the image sensing section 2 and motion image to be delivered to an arbitrary user. The network 4 can be a wired LAN such as Ethernet (registered trademark), a wireless LAN represented by IEEE802.11b, etc., or public switched network such as ISDN.

This embodiment describes the image processing section 1, image sensing section 2 and communication section 3 as different blocks in FIG. 1, but when this embodiment is constructed by hardware, these blocks need not be distinguished physically. The image processing section 1, image sensing section 2 and communication section 3 may be implemented in various modes, for example, separate ICs or some of those sections may be integrated (e.g., the development processing section 23, image processing section 1 and network control section 30 are integrated) on a single chip. Therefore, the mode will not be restricted by the descriptions of the following embodiments.

Furthermore, the image processing section 1, image sensing section 2 and communication section 3 are executed based on a program stored in a storage medium such as ROM readable by a CPU (control unit, not shown). For the image processing section 1 in particular, the CPU gives instructions to a control sequencer 400 which will be described later.

Furthermore, the processing performance decision section 31 in the network control section 30 decides whether all the contents of the processing requested by the display apparatuses 61, 62, 63 can be processed by the image processing section 1 within 1 video period or not. Such processing is implemented basically by software operating on the CPU. In this regard, if it is decided that processing cannot be completed within 1 video period, the processing performance decision section 31 rejects the request at the time at which processing can no longer be carried out and subsequent requests. Then, the rejection will be notified to the display apparatuses whose requests have been rejected. Then, any of the video images provided for the other display apparatuses whose requests are accepted is delivered to the display apparatuses whose requests have been rejected.

Figure 3B:
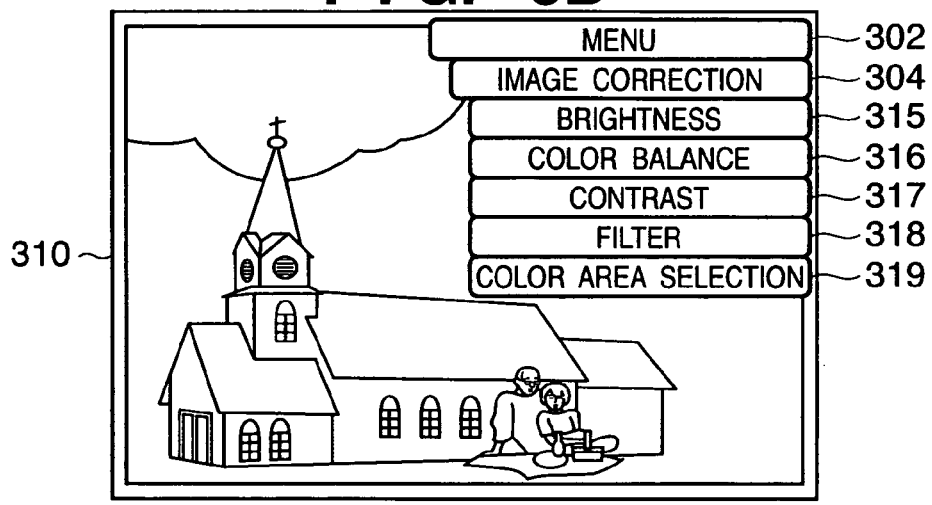
Figure 3C:
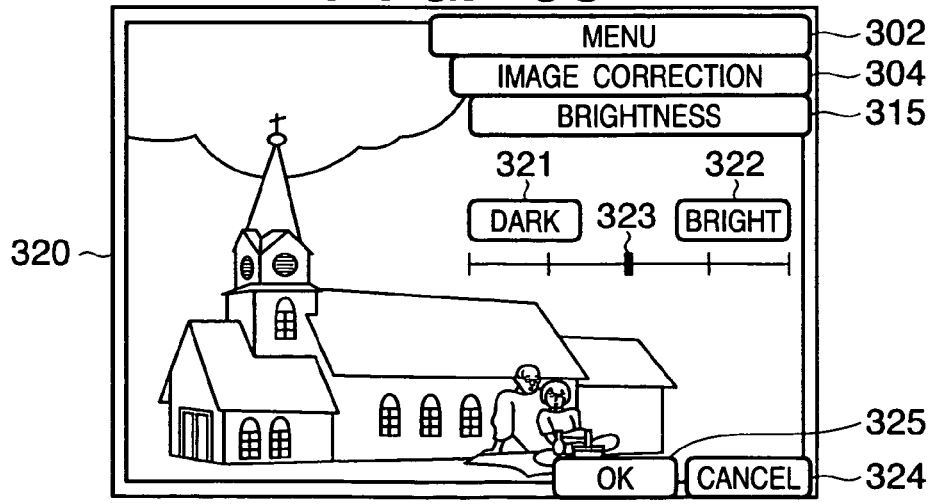

FIGS. 3A to C show display examples of video images in the display apparatuses 61 to 63 that can be connected to a network according to this embodiment. As the display apparatuses 61 to 63, for example, a personal computer, etc., can be used. In FIG. 3A, reference numeral 301 denotes a display example in which a motion image sent from the image sensing apparatus 5 is output to the display section on the display apparatus side. Reference numeral 302 denotes a menu icon which is a user interface (UI) displayed according to the user's operation and selecting this item allows various functions of the display apparatus to be selected. When the menu icon 302 is selected (e.g., selected using a pointing device), a menu including icons 303 to 305 is displayed.

The image selection icon 303 is used to select whether to display an image from the image sensing apparatus 5 or display a stored image. The image correction icon 304 is used to select image correction processing according to this embodiment. Selecting the image correction icon 304 displays a menu including icons 315 to 319 as shown in FIG. 3B to allow various types of image correction (brightness adjustment, color balance adjustment, contrast adjustment, filter processing, and color area selection) to be selected. The range specification icon 305 provides the operation for specifying a desired range to be extracted from an image.

In FIG. 3B, a display 310 is changed from the display 301 by selecting the image correction icon 304. The brightness icon 315 is used to adjust the brightness of the entire display image. The color balance icon 316 is used to adjust the color balance of the entire display image. The contrast icon 317 is used to adjust the contrast of the entire display image. The filter icon 318 is used to apply filter processing to the entire display image. The color area selection icon 319 is used to adjust the color area of the entire display image.

For example, when the brightness icon 315 is selected, the image is changed to one including a user interface for adjusting the brightness as shown on a display 320 in FIG. 3C allowing the brightness to be adjusted. A luminance decreasing icon 321 is selected to darken the overall screen and a luminance increasing icon 322 is selected to brighten the overall screen. A bar icon 323 indicates the state of the luminance level of the overall screen and also allows the user to gradually change the luminance level of the overall screen by operating this bar icon 323. A cancel icon 324 is an icon to indicate that no change will be made to the luminance (change to the brightness). A luminance change authorization icon 325 is an icon to instruct the execution of a change to the luminance (change to the brightness).

FIG. 4 is a block diagram showing details of an image processing section 1 included in the image sensing apparatus 5 according to the First Embodiment.

In FIG. 4, a control sequencer 400 communicates with the processing performance decision section 31 in the network control section 30 and realizes display processing requested from the display apparatus side. For this purpose, the control sequencer 400 gives the respective sections in the image processing section 1 appropriate operation instructions for carrying out arbitrary processing on one frame image a plurality of times for 1 vertical synchronization period in time-series. Here, the respective sections in the image processing section 1 refer to an image read DMA section 410, an anterior selector section 411, an anterior demultiplexer section 412, an image correction execution section 413, a posterior selector section 419, a posterior demultiplexer section 420, a CODEC section 421, a CODEC DMA section 423 and a work memory DMA section 422.

A frame buffer 401 stores motion image data output from the development processing section 23 in 1-frame units. The image read DMA section 410 reads image frame data of an arbitrary angle of view from any of the frame buffer 401 or work memory 425 according to an instruction of the control sequencer section 400. The anterior selector section 411 selectively outputs any of image frame data output from the image read DMA section 410 or image frame data output from the posterior demultiplexer section 420 to the anterior demultiplexer section 412 according to an instruction from the control sequencer section 400. The anterior demultiplexer section 412 selectively outputs the image frame data output from the anterior selector section 411 to the various processing sections in the image correction execution section 413 according to an instruction from the control sequencer section 400.

In the image correction execution section 413, a plurality of image correction processes (414 to 418) are operated in parallel. A luminance correction section 414 adjusts a luminance (Y) signal of the image data and changes the brightness of the image. A color correction section 415 adjusts a color difference (Cb/Cr) signal of the image data and changes the color balance of the image. A γ correction section 416 applies γ correction to a tone curve of the image data and changes the contrast of the image. A filter processing section 417 applies filter processing to the image data and carries out contour enhancement of the image and unsharp masking to reduce an encoding capacity. A color space conversion section 418 changes the number of bits of the image data and changes color tone of the image according to a color matrix coefficient. It is possible to supply uncorrected image data to the posterior selector section 419 by selecting a path 426.

The posterior selector section 419 selectively outputs image frame data output from the processing sections (414 to 418) in the image correction execution section 413 to the posterior demultiplexer section 420 according to an instruction from the control sequencer section 400. The posterior demultiplexer section 420 outputs the image frame data output from the posterior selector section 419 to any one of the CODEC section 421, work memory DMA section 422 or anterior selector section 411 according to an instruction from the control sequencer section 400.

The CODEC section 421 encodes the image frame data output from the posterior demultiplexer section 420 in a format such as MJPEG, MPEG2 or MPEG4. The work memory DMA section 422 transfers (DMA transfer) the image frame data output from the posterior demultiplexer section 420 to a work memory 425. The CODEC DMA section 423 transfers (DMA transfer) the encoded data output from the CODEC section 421 to a data buffer 424. The data buffer 424 stores data encoded by the CODEC section 421 and outputs the stored data according to a request of the network control section 30. The work memory 425 temporarily stores image frame data output from the posterior demultiplexer section 420. The image frame data stored in the work memory 425 is used for reprocessing according to an instruction from the control sequencer section 400 or for carrying out different image correction processing on an arbitrary area in the image frame again.

The frame buffer 401, work memory 425 and data buffer 424 can also be constructed as an on-chip memory in the same IC. Or they can also be implemented as a memory device outside the IC (e.g., SDRAM (synchronous DRAM) such as SDR (Single Data Rate)) or DDR (Double Data Rate), etc.) connected to the IC outside the IC. Furthermore, the memory can also adopt various structures such as arrangement on a different memory device or arrangement on one and the same memory device.

FIG. 5 illustrates internal operations of various processing sections of the image processing section 1 according to this embodiment. FIG. 5 shows a case where a frame image corresponding to 1 vertical scanning period output from the development processing section 23 and stored in the frame buffer 401 is subjected to correction processing. That is, FIG. 5 shows the case where after the 1-frame image corresponding to 1 vertical scanning period is stored in the frame buffer 401, the frame image is subjected to correction processing. However, it is also possible to construct the present invention in such a way that the first correction processing is carried out at substantially the same time as the development processing section 23 outputs and starts to write the frame image into the frame buffer 401. In that case, the delay time by the image processing section 1 is further shortened. Detailed explanations on FIG. 5 will be described later.

Next, operations of the image sensing apparatus and display apparatus according to the First Embodiment will be explained with reference to FIG. 2. FIG. 2 is a flow chart explaining processing by the image sensing apparatus 5 and display apparatuses 61, 62, 63 according to this embodiment. This embodiment will explain operations when three display apparatuses are connected to one image sensing apparatus, but it goes without saying that the present invention is not limited to such a structure.

When the display apparatus 61 accesses the image sensing apparatus 5 and a communication is established (steps S201, S221), setting information is communicated between the display apparatus 61 and image sensing apparatus 5 and the setting information on the display apparatus 61 is stored in the image sensing apparatus 5 (steps S202, S222). The setting information includes the number of XY pixels (which may also be expressed by resolution) of an image that can be displayed by the display apparatus 61, encoding format and transfer rate, etc. When explained in further detail, the display apparatus 61 sends the setting information on the apparatus to the image sensing apparatus 5. The image sensing apparatus 5 receives the transmission data through the network interface section 32. Then, the image sensing apparatus 5 transmits the received contents (setting information) to the display apparatus 61 to confirm with the display apparatus 61 whether the received setting information is correct or not. The display apparatus 61 decides whether the received contents match the transmitted contents or not and when there is no problem, the display apparatus 61 transmits a command indicating the start of processing (OK signal in FIG. 2).

In the image sensing apparatus 5 which has received the command indicating the start of processing, the processing performance decision section 31 decides the setting for the image sensing section 2 and control sequencer section 400 based on the transmission data (step S203). Next, the processing performance decision section 31 instructs the image sensing section 2 and control sequencer section 400 to output an image (step S204). Upon receipt of this instruction, the image processing section 1 starts to output the image (step S205) and a motion image is output to the display apparatus 61 through the communication section 3 and network 4. The output image is displayed by the display apparatus in steps S223 and S224.

According to the setting of the image processing section 1 for a motion image output first, the motion image is output without being subjected to any image correction. That is, all the frame image corresponding to 1 vertical scanning period stored in the frame buffer 401 is read by the image read DMA section 410 and input to the image correction execution section 413 from the anterior selector section 411 via the anterior demultiplexer section 412. In the image correction execution section 413, the path 426 which outputs data directly from the anterior multiplexer section 412 to the posterior selector section 419 is selected. Furthermore, the output from the posterior demultiplexer section 420 is set so as to be supplied to the CODEC section 421. By selecting the processing operation in this way, the encoded motion image which is subjected to no image correction is output to the display apparatus 61 through the communication section 3 and network 4.

In this embodiment, the processing performance decision section 31 is assumed to be located in the network control section 31 of the communication section 3, but the present invention is not limited to this. For example, it is possible to place the processing performance decision section 31 in the image processing section 1 or mount it as part of the function built in the control sequencer section 400 of the image processing section 1, and the mounting position thereof is not limited.

Even when the display apparatuses 62, 63 carry out the above described connection procedure, neither of them requests image correction processing, and therefore the control sequencer section 400 needs only to continue the above described data flow processing. Therefore, at this time point in the present embodiment, the communication section 3 delivers the same encoded motion image to the three display apparatuses.

Next, the communication operations of the display apparatus and image sensing apparatus 5 when the user operates the display apparatus and requests correction processing will be explained. A case where the display apparatus 61 requests correction processing will be explained below as an example.

The display apparatus 61 which has received the motion image data output from the image sensing apparatus 5 carries out decompression processing on the received motion image and displays the image on the screen of the display apparatus 61 (steps S223, S224). The display 301 shown in FIG. 3A is a display example when the user causes the display apparatus 61 to display the menu icon 302, image selection icon 303, image correction icon 304 and range specification icon 305 on the motion image. When, for example, the user sees this motion image and wants it to be displayed a little brighter, the user selects the image correction icon 304, which causes the screen to be changed to the display 310 in FIG. 3B. When the user selects the brightness icon 315 in this display, the screen is changed to the display 320 shown in FIG. 3C.

Every time the user selects and operates the bar icon 323 (or every time the user operates the luminance decreasing icon 321 and luminance increasing icon 322), the display apparatus 61 transmits an image correction item and correction amount to the image sensing apparatus 5. This processing corresponds to steps S225, S226, S231, S232 and S233. The image sensing apparatus 5 which has received this information transmits the received setting as is to the display apparatus 61 to confirm whether the received information is correct or not (step S206). The display apparatus 61 decides whether the received contents match the transmitted contents or not and if there is no problem, it transmits a command indicating the start of processing (OK signal in this embodiment). The image sensing apparatus 5 which has received the command indicating the start of processing decides the contents of the received data through the network control section 30. When the network control section 30 decides that the information relates to image correction (step S207), it causes the image processing apparatus 1 to execute image correction processing through the control sequencer 400 in step S208.

When the brightness of the image is corrected as shown above (step S231), the processing performance decision section 31 decides the setting for the control sequencer section 400 from the correction item and correction amount and instructs the control sequencer section 400 on the setting. In this way, the motion image whose brightness has been corrected is delivered only to the display apparatus 61 (step S208). Furthermore, when an angle of view is instructed (step S232), the image is output according to the instructed angle of view (step S209). Details of this processing will be explained in a Second Embodiment. Furthermore, when image control information (image output stop, image change, etc.) is transmitted in step S233, corresponding image control is carried out in step S210.

Next, as in the case of the user's operation in the display apparatus 61, the internal operation of the image processing section 1 when the user who uses the display apparatus 62 requests a setting for changing color balance and the user who uses the display apparatus 63 requests image correction using a filter will be explained. In this case, it is necessary to transmit the image whose color balance is changed to the display apparatus 62 and transmit the image subjected to filter processing to the display apparatus 63. That is, it is necessary to apply requested processing to images, acquire a plurality of processed images and send the images to their respective request sources. With reference to FIG. 5, the manner in which such image processing and transmission processing are realized in this embodiment will be explained below.

A frame image 510 subjected to development processing which is output from the development processing section 23 is written into an arbitrary area A of the frame buffer 401 as an N frame write image 511. Furthermore, the next frame image 530 is written into an arbitrary area B of the frame buffer 401 as an N+1 frame write image 532. In this way, write processing is carried out on different areas of the frame buffer 401 alternately and image correction is performed on a frame image (N−1 frame image 512, N frame image 531) written in the area for which write processing has not been carried out at that time point. Performing such control makes it possible to successively process frame images which are sent at fixed intervals. The frame development processing images 510, 530 are output from the development processing section 23 within a period of approximately 1/30 ms which is 1 vertical scanning period.

The control sequencer section 400 instructs the image read DMA section 410 to read frame images at a speed higher than at least the speed at which the development processing section 23 outputs the frame images. That is, when independent requests (different requests) arrive from the currently connected display apparatuses (the number of display apparatuses connected is decided by the processing performance decision section 31), the control sequencer section 400 instructs the image read DMA section 410 to read frame images at a speed at which all the requests can be processed. In this embodiment, three display apparatuses are connected and as shown in FIG. 5, operation is performed in such a way that image data after three types of correction processing is obtained during 1 vertical scanning period. The operation shown in FIG. 5 will be explained in further detail below. Note that operations of the respective sections of the image processing section 1 which will be explained below are realized according to instructions from the control sequencer section 400.

The image data DMA section 410 reads the N−1 frame image 512 stored in the area B (frame read processing 513) and transfers it to the anterior selector section 411 as the frame image to perform luminance correction requested from the display apparatus 61. The anterior selector section 411 selects the data from the image read DMA section 410 and outputs the input frame image to the anterior demultiplexer section 412. The anterior demultiplexer section 412 outputs the input frame image to the luminance correction section 414 where frame luminance correction processing 514 is executed. The frame image subjected to luminance correction processing by the luminance correction-section 414 is output to the posterior selector section 419. The posterior selector section 419 outputs the frame image input from the luminance correction section 414 and subjected to luminance correction processing to the posterior demultiplexer section 420. The posterior demultiplexer section 420 outputs the frame image subjected to luminance correction processing to the CODEC section 421. The CODEC section 421 executes image encoding in the format instructed from the control sequencer section 400 (frame encoding processing 515) and outputs the frame encoded image subjected to luminance correction to the data buffer DMA section 423. When the data buffer DMA section 423 starts the processing of recording the frame encoded image of the N−1 frame in the data buffer 424, the control sequencer section 400 outputs a communication authorization signal of the motion image encoded data for the display apparatus 61 to the network control section 30. The network control section 30 starts a communication of the motion image encoded data stored in the data buffer 424 with the display apparatus 61 according to this communication authorization signal.

The control sequencer section 400 monitors the encoding processing by the CODEC section 421. When the completion of the frame encoding processing 515 on the N−1 frame image is detected, the control sequencer section 400 instructs the image read DMA section 410 to read the N−1 frame image 512 as the frame image to be subjected to color correction requested by the display apparatus 62. The image read DMA section 410 executes frame read processing 516 and the read frame image is input to the color correction section 415 through the anterior selector section 411 and anterior demultiplexer section 412. The color correction section 415 executes color correction processing 517 on the frame image. The frame image subjected to color correction processing by the color correction processing 517 is input to the CODEC section 421 through the posterior selector section 419 and posterior demultiplexer section 420. The CODEC section 421 carries out image encoding (frame encoding processing 518) in the format instructed from the control sequencer section 400 and outputs the processing result to the data buffer DMA section 423 as the frame encoded image subjected to color correction. When the data buffer DMA section 423 starts the processing of recording the frame encoded image subjected to color correction in the data buffer 424, the control sequencer section 400 outputs a communication authorization signal of the motion image encoded data for the display apparatus 62 to the network control section 30. The network control section 30 starts a communication of the motion image encoded data stored in the data buffer 424 with the display apparatus 62 according to this communication authorization signal.

The control sequencer section 400 monitors encoding processing by the CODEC section 421. When the completion of encoding processing 518 on the frame image subjected to color correction is detected, the control sequencer section 400 instructs the image read DMA section 410 to read the N-1 frame image 512 as the frame image to be subjected to filter processing requested from the display apparatus 63. In frame read processing 519, the N-1 frame image 512 read by the image read DMA section 410 is input to the filter processing section 417 through the anterior selector section 411 and anterior demultiplexer section 412. In frame filter processing 520, the frame image processed by the filter processing section 417 is input to the CODEC section 421 through the posterior selector section 419 and posterior demultiplexer section 420 as the frame image subjected to filter processing. The CODEC section 421 carries out image encoding in the format instructed from the control sequencer section 400 (frame encoding 521) and outputs the processing result to the data buffer DMA section 423 as the frame encoded image subjected to filter processing. When the data buffer DMA section 423 starts processing of recording the frame encoded image subjected to filter processing in the data buffer 424, the control sequencer section 400 outputs a communication authorization signal of the motion image encoded data for the display apparatus 63 to the network control section 30. The network control section 30 starts a communication of the motion image encoded data stored in the data buffer 424 with the display apparatus 63 according to this communication authorization signal.

As explained above, according to the First Embodiment, processing from frame image read to encoding through image correction is executed a plurality of times for 1 vertical scanning period by changing the inner connection of the image processing section 1 in time-series. This processing executed a plurality of times is repeated for every vertical scanning period (every 1 frame) and it is thereby possible to output a plurality of consecutive motion image encoded files simultaneously.

Furthermore, according to the First Embodiment, the storage section 33 is provided inside the image sensing apparatus 5. For this reason, it is possible not only to output images to the network, but also to subject camera motion images taken by the own camera such as a digital camera or digital video camera to arbitrary image processing, store the images and output an arbitrary motion image to an outside display apparatus through the network simultaneously.

The above described embodiment has described the case where results of different image corrections carried out on three connection destinations are transmitted, but the number of processes can be changed according to the number of connections at the image transmission destination, for example, by enhancing the speed of the processing frequency. Furthermore, as a measure for energy saving, it is also possible to change the operation frequency of the image processing section 1 through instructions from the processing performance decision section 31 and the like, in the case where only one type processing is performed and in the case where a plurality of types of processing are performed within 1 vertical scanning period. Or it is also possible to always operate the image processing section 1 at a high-speed processing frequency and stop the operation thereof for each processing section during a period within 1 vertical scanning period during which no processing is performed.

Second Embodiment

The First Embodiment has explained the processing in the case where the same image is subjected to different image corrections for three connection destinations simultaneously. Furthermore, the First Embodiment has explained the processing of applying one type of image processing to the respective output destinations and outputting the processing results, but it may be necessary to apply a plurality of types of image processing depending on the request from the display apparatus at the output destination. Example of this are luminance correction+filter processing, luminance correction+extraction at a desired angle of view, etc. The Second Embodiment will explain a structure for realizing such composite processing.

Figure 7A:
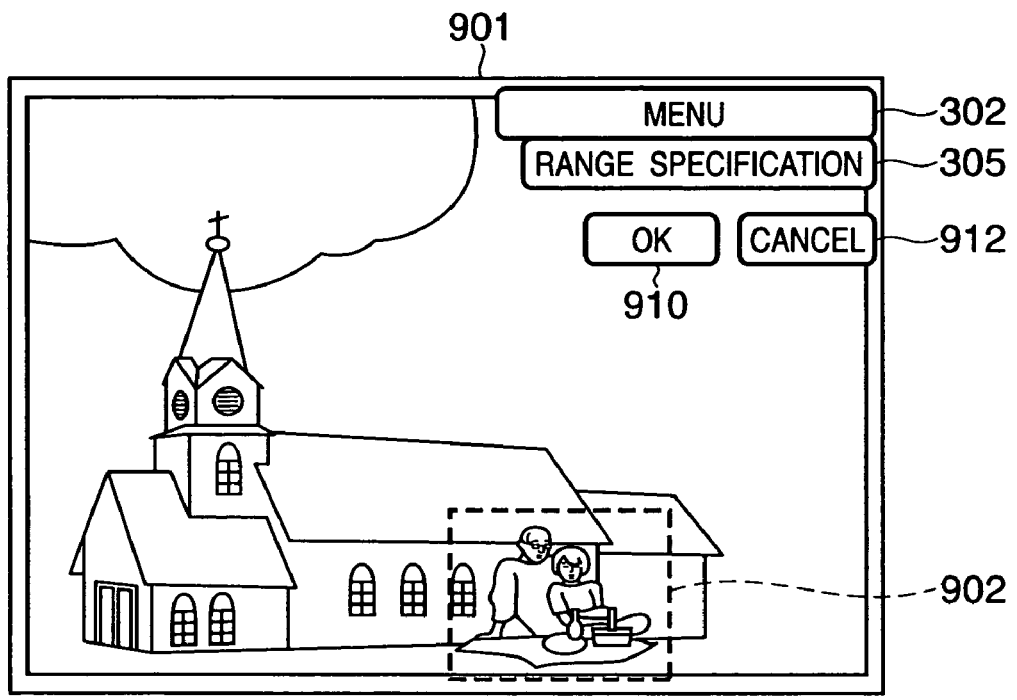
FIGS. 7A, 7B illustrate display examples on the display apparatus side that can be connected to a network according to the Second Embodiment.

As in the case of the First Embodiment, an image sensing apparatus 5 and a plurality of display apparatuses are connected through a network (FIG. 1). FIG. 6 illustrates operations of various processing sections of an image processing section 1 according to the Second Embodiment. FIGS. 7A and B illustrate display examples on the display apparatus that can be connected to a network according to the Second Embodiment.

In FIG. 7A, a display 901 is a UI display example when an entire frame image is displayed and a frame 902 showing a clipping area is displayed on the display 901 by selecting a range specification icon 305. When the user operates the position and size of the frame 902, selects an arbitrary area and then selects an OK icon 910 for instructing the fixing of the frame position, only the motion image in the frame 902 is transmitted to the display apparatus.

Figure 7B:
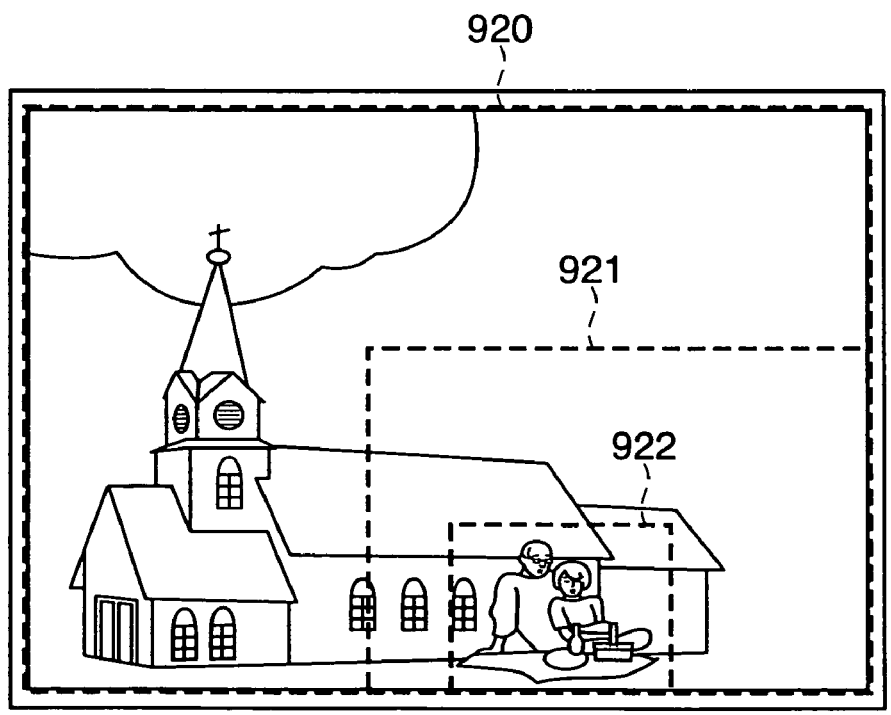

As in the case of the First Embodiment, a case where three display apparatuses 61, 62, 63 are connected will be explained as an example. For example, suppose in the display in FIG. 7B that:

the display apparatus 61 requests that an entire camera image (920) be subjected to luminance correction,
the display apparatus 62 requests that part of a camera image (921) be subjected to luminance correction and filter processing, and
the display apparatus 63 requests that part of the camera image (920) be subjected to color space conversion processing and filter processing.

In such a case, a processing performance decision section 31 decides the contents of overlapping of the requested angles of view and requested image correction and instructs a control sequencer section 400 on the most efficient inner processing. In the above described example, the angle of view 921 requested by the display apparatus 62 is included in the angle of view 920 requested by the display apparatus 61 and image correction processing also includes the same luminance correction processing. For this reason, a decision is made to determine the sequence in such a way that the entire frame image is subjected to image correction processing once and stored in a work memory 425 and then the part to be processed (partial image 921) is individually read and processed. Furthermore, the display apparatus 63 requests that a motion image be delivered in the manner where only a specified part of the entire frame image display is subjected to a plurality of image corrections. In such a case, an angle of view 922 of the specified part is included in the angle of view 920 of the display apparatus 61, but the requested contents of correction processing are different and therefore the processing performance decision section 31 decides that correction and compression processing are performed based on individual reads.

With reference to FIG. 6, the operation of the image processing section 1 which meets the above described request will be explained in detail. The processing operations of the various following sections are executed according to instructions from the control sequencer section 400. Furthermore, FIG. 6 shows how an N frame image is written in an area A and an N-1 frame image written in an area B is processed, and writing to/reading from the areas A, B are performed alternately as explained in FIG. 5.

First, an image read DMA section 410 reads an entire N-1 frame image 812 through frame read processing 813. The frame image read is input to a luminance correction section 414 through an anterior selector section 411 and anterior demultiplexer section 412, where luminance correction processing 814 is executed. The frame image subjected to luminance correction processing by the luminance correction section 414 is input to a work memory DMA section 422 through a posterior selector section 419 and posterior demultiplexer section 420 (work memory write processing 815).

When the write processing 815 of the frame image subjected to luminance correction into a work memory 425 is completed, work memory read processing 816 is executed. That is, the image read DMA section 410 reads the image corresponding to the angle of view 920 requested by the display apparatus 61 out of the frame images stored in the work memory 425 as a luminance correction image. In this embodiment, the angle of view 920 instructed by the display apparatus 61 is an image corresponding to entire frames. The luminance correction image read from the work memory 425 by the image read DMA section 410 in the work memory read processing 816 are supplied to the CODEC section 421 as is through a path 426, posterior selector section 419 and posterior demultiplexer section 420. The luminance correction image is subjected to encoding processing 817 by a CODEC section 421 and then written into a data buffer 424 by a data buffer DMA 423 as an encoded luminance correction image. When the work memory DMA section 423 starts the processing of recording the encoded image into the data buffer 424, the control sequencer section 400 outputs a communication authorization signal of the motion image encoded data to a network control section 30 for the display apparatus 61.

Next, the control sequencer section 400 monitors the encoding processing 817 by the CODEC section 421 and detects that the encoding processing 817 is completed. Then, the control sequencer section 400 instructs the image read DMA section 410 to read an image corresponding to the angle of view 921 requested by the display apparatus 62 out of the frame images stored in the work memory 425. This causes the partial image data corresponding to the angle of view 921 (specified area) requested by the display apparatus 62 to be read from the frame image subjected to luminance correction in the work memory 425 as an image to be subjected to filter processing requested by the display apparatus 62.

The partial image data read by the image read DMA section 410 is input to a filter processing section 417 through the anterior selector section 411 and anterior demultiplexer section 412. Thus, filter processing 821 is performed on the partial image data subjected to the luminance correction corresponding to the specified area read from the work memory 425. The partial image data 821 of the specified area subjected to filter processing is subjected to encoding processing 822 according to the display apparatus 62 by the CODEC section 421 and then written into the data buffer 424 by the CODEC DMA section 423. When angles of view overlap with one another and the same correction processing is included through this sequential processing, it is possible to realize sharing of the processing.

Next, the image processing requested by the display apparatus 63 is color space conversion processing and filter processing on the specified area and the above described luminance correction is not included. Therefore, partial image data which becomes a processing target is newly read from an N-1 frame image 812. Therefore, the partial image data corresponding to the angle of view 922 requested by the display apparatus 63 is read from the N-1 frame image 812 by the image read DMA section 410 (specified area read processing 830). The partial image data read is input to a color space conversion section 418 through the anterior selector section 411 and anterior demultiplexer section 412 and subjected to predetermined conversion processing. The partial image data processed by the color space conversion processing section is transferred to the anterior selector section 411 by the posterior demultiplexer section 420 again and input to a filter processing section 417. This causes filter processing 822 which is the second processing to be applied to the partial image data. The partial image data subjected to the color space conversion processing and filter processing in this way is input to the CODEC section 421 through the posterior selector section 419 and posterior demultiplexer section 420, where the partial image data is subjected to encoding processing 834. Then, the partial image data is input to the data buffer 424 through the data buffer DMA 423. Next, the control sequencer section 400 reads a predetermined amount of the part that follows the first read image out of the image corresponding to the angle of view 922 requested by the display apparatus 63 from the N-1 frame image 812 through the image read DMA section 410 and repeats the above described processing. By repeating this sequential processing, it is possible to execute a plurality of correction processes on a frame image from which one area is specified.

Third Embodiment

In the First Embodiment and Second Embodiment, the image processing section 1 has the inner structure as shown in FIG. 4 in which the respective image correction processes are arranged in parallel so as to distribute image data to correction processing specified by the demultiplexer section. However, when such a structure is adopted, the data flow control by the control sequencer section 400 becomes complicated and the processing time possibly increases.

Figure 8:
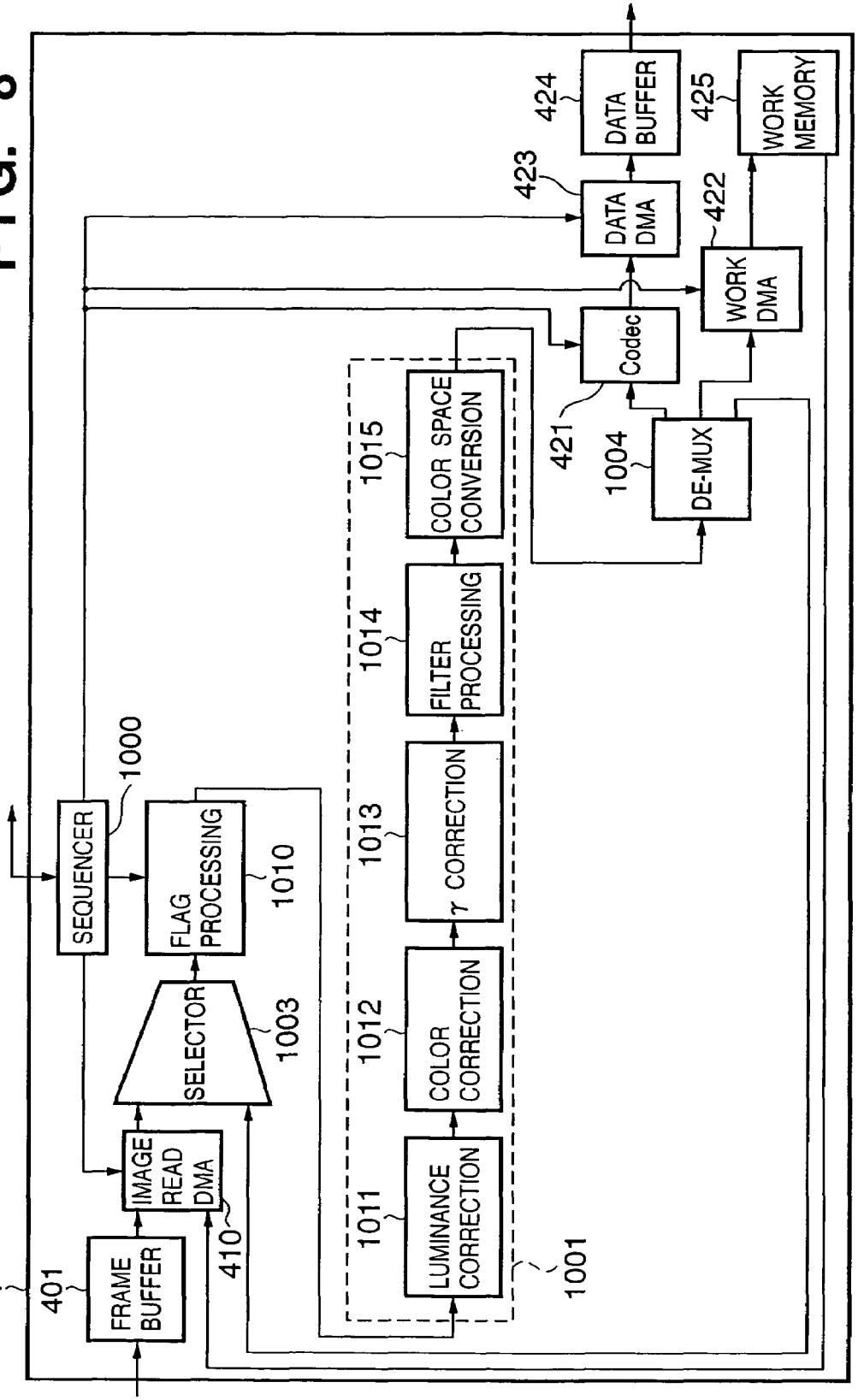
FIG. 8 is a block diagram showing details of an image processing section according to a Third Embodiment.

In order to solve the above described problem, a Third Embodiment will describe an example in which the image correction execution section 413 is modified. As shown in FIG. 8, according to the Third Embodiment, the respective processing sections in an image correction execution section 1001 are connected in series like a pipeline. A flag processing section 1010 for adding a flag indicating whether each correction process should be carried out or not and a parameter indicating an amount of each of various types of correction is provided before each processing section to thereby simplify data flow control and shorten the processing time.

FIG. 8 is a block diagram showing details of an image processing section 1 according to the Third Embodiment. In FIG. 8, a control sequencer section 1000 carries out settings of read/write areas for each DMA section, instructs the flag processing section 1010 on a flag addition or processing such as switching of an encoding system on a CODEC section 421. The image correction execution section 1001 includes a plurality of correction processing blocks connected like a pipeline. A selector section 1003 decides a flag added to image data, selects any of the image data output from an image read DMA section 410 or image data output from a demultiplexer 1004 and outputs the selected image data to the image correction execution section 1001.

The demultiplexer 1004 decides a flag added to image data output from the image correction execution section 1001 and outputs the input data to any of the CODEC section 421, work memory DMA section 422 or selector section 1003. The flag processing section 1010 adds a flag for instructing which process in the image correction execution section 1001 should be carried out on the image data according to an instruction of the control sequencer section 1000 and adds a parameter indicating a correction amount for the specified correction processing.

The luminance correction section 1011 decides a flag added by the flag processing section 1010, executes luminance correction processing when a luminance correction processing execution flag is set and output data to the next color correction processing section 1012 when the flag is not set. The color correction section 1012 decides the flag added by the flag processing section 1010, executes luminance correction processing when a color correction processing execution flag is set and outputs data without applying the color correction processing to a γ correction section 1013 that follows when the flag is not set. The γ correction section 1013 decides the flag added by the flag processing section 1010, executes γ correction processing when a γ correction processing execution flag is set and outputs data without applying the γ correction processing to a filter processing section 1014 that follows when the flag is not set. The filter processing section 1014 decides the flag added by the flag processing section 1010, executes filter processing when a filter processing execution flag is set and outputs data without applying the filter processing to a color space conversion processing section 1015 that follows when the flag is not set. The color space conversion section 1015 decides the flag added by the flag processing section 1010, executes color space conversion processing when a color space conversion processing execution flag is set and outputs data without applying the color space conversion to the demultiplexer 1004 when the flag is not set.

Figure 9:
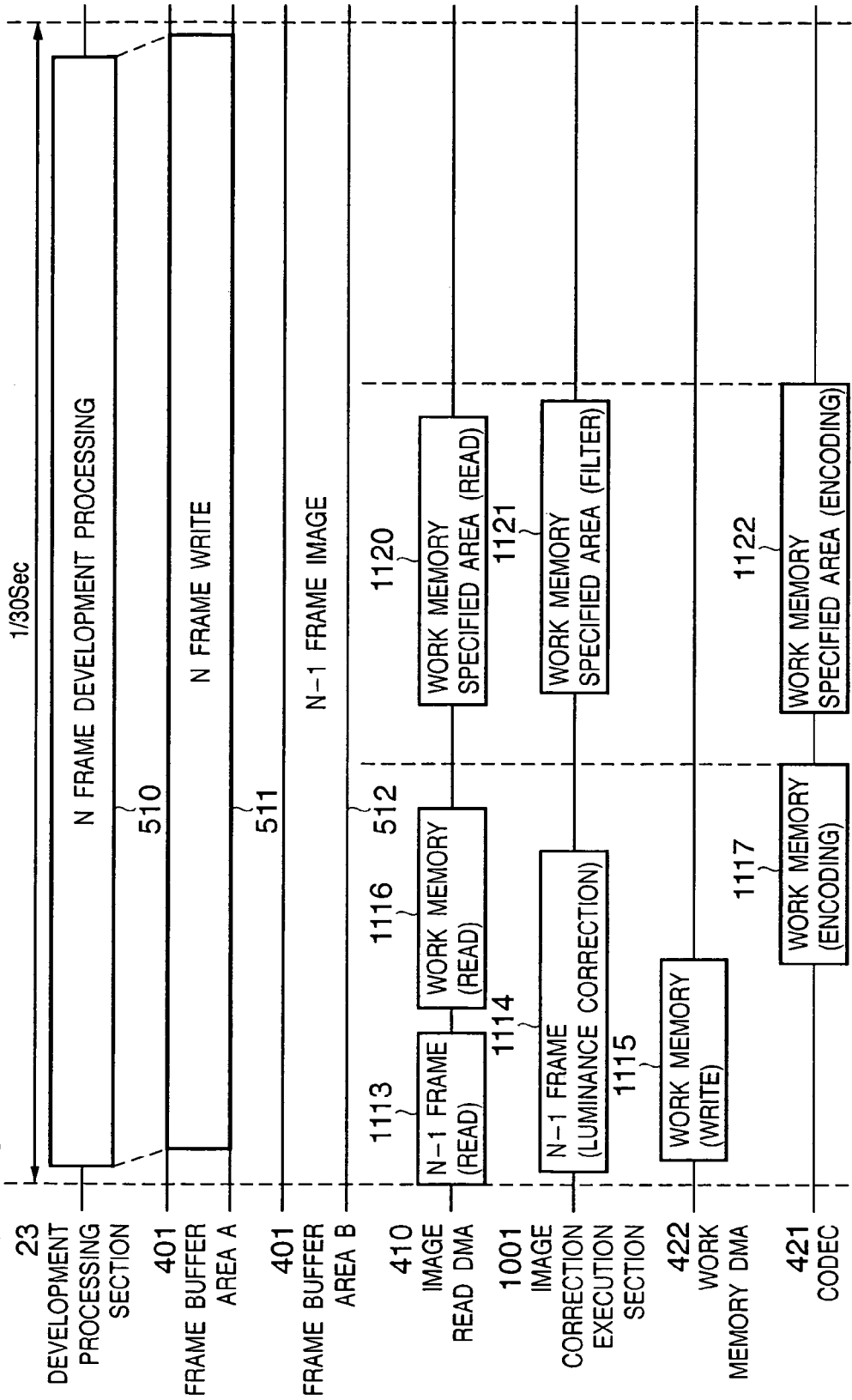
FIG. 9 illustrates internal operations of the respective processing sections of the image processing section according to the Third Embodiment.

FIG. 9 illustrates internal operations of the respective processing sections of the image processing section 1 according to the Third Embodiment. The internal operations of the image processing section 1 according to the Third Embodiment having the structure explained in FIG. 8 will be explained. An example in which requests from two different display apparatuses are processed will be explained below. For example, suppose a request for "carrying out predetermined luminance correction and displaying the entire frame image" and a request for "carrying out the predetermined luminance correction, then carrying out filter processing and displaying an image of the specified angle of view" (however, suppose both requests have the same luminance correction contents).

The control sequencer section 1000 acquires information on the range of the angle of view and correction processing contents from two different display apparatuses from a processing performance decision section 31 and determines a processing schedule. When a development processing section 23 starts to output 1 vertical scanning period of an N frame image, the control sequencer 1000 starts to write the N frame image in one area (area A) of a frame buffer 401. Then, in response to the start of this write, the control sequencer 1000 instructs the image read DMA section 410 to read an N−1 frame image 512 from the other area (area B) of the frame buffer 401. In response to this instruction, the image read DMA section 410 reads the N−1 frame image (N−1 frame read processing 1113). The frame image read is input to the flag processing section 1010 through the selector section 1003.

According to an instruction from the control sequencer section 1000, the flag processing section 1010 adds a flag for instructing "processing of carrying out only luminance correction processing on the entire image and then storing it in the work memory 425" at the start of the input frame image and a parameter indicating a luminance correction amount. The frame image with the above described flag and parameter added is supplied to the image correction execution section 1001. The image correction execution section 1001 supplies a frame image to the luminance correction section 1011 first. The luminance correction section 1011 examines the flag added to the start of the input frame image, decides whether or not to carry out luminance correction and decides which part of the image should be processed when luminance correction is carried out. In this example, a flag indicating that luminance correction processing is carried out on the entire image, and therefore luminance correction processing according to the specified parameter is carried out on the entire frame image (N−1 frame luminance correction processing 1114).

The frame image subjected to the luminance correction is input to the color correction processing section 1012 which is the next correction processing. In this example, no flag which has been added by the flag processing section 1010 for carrying out color correction processing is set, and therefore the frame image is subjected to no processing and output to the posterior γ correction processing section 1013. Likewise, no flag indicating the execution of processing is set in the γ correction processing section 1013 and filter processing section 1014 and color space processing section 1015, and therefore none of the correction processing is performed and the frame image subjected to luminance correction is output to the demultiplexer section 1004. Since the flag for storing data in the work memory 425 is set, the demultiplexer section 1004 outputs the N−1 frame image subjected to luminance correction to the work memory DMA section 422.

The work memory DMA section 422 writes the input frame image into the work memory 425 (work memory write processing 1115).

The control sequencer section 1000 monitors the completion of the operation of this work memory write processing 1115 and instructs the image read DMA section 410 to read the frame image in the work memory 425 when the completion of the write is detected. The image read DMA section 410 reads the frame image written by the work memory write processing 1115 from the work memory 425 (work memory read processing 1116). The frame image read through the work memory read processing 1116 is supplied to the flag processing section 1010 through the selector section 1003. The flag processing section 1010 adds a flag indicating that CODEC processing will be carried out without any image correction processing to the frame image according to an instruction of the control sequencer section 1000 and supplies the flag to the image processing execution section 1001. As a result, the frame image is output to the demultiplexer section 1004 without being subjected to any correction processing at the image processing execution section 1001 (passing through all the processing sections) and input to the CODEC section 421. The CODEC section 421 encodes the input frame image (encoding processing 1117).

When the control sequencer section 1000 detects that the encoding processing 1117 by the CODEC section 421 is completed, it then starts preparations of the image data for a different display apparatus. First, the control sequencer section 1000 instructs the image read DMA section 410 to extract image data having an angle of view specified by the processing performance decision section 31 from the frame image written into the work memory 425 through the work memory write processing 1115 and subjected to luminance correction. The image read DMA section 410 which has received the above described instruction reads the image in the specified area from the work memory 425 (work memory specified area read processing 1120). The image data read is input to the flag processing section 1010 through the selector section 1003.

According to an instruction from the control sequencer section 1000, the flag processing section 1010 adds a flag for carrying out filter processing and CODEC processing and a parameter indicating the processing amount of the filter processing at the start of the specified area image 1120 and supplies them to the image correction execution section 1001. Since no flag is set in the luminance correction processing section 1011, color correction processing section 1012 and γ processing section 1013, no processing is carried out. The filter processing section 1014 carries out filter processing according to the instruction of the parameter (work memory specified area filter processing 1121) and outputs the processing result to the color space conversion section 1015. The color space conversion section 1015 carries out no processing, inputs the specified area filter processing image 1121 to the CODEC section 421 through the demultiplexer section 1004 and carries out encoding processing in the specified system.

As explained above, each processing section automatically decides a flag and parameter for specifying the processing added by the flag processing section and carries out data flow processing, and can thereby simplify the decision on the processing and consequently shorten the processing time.

Fourth Embodiment

Figure 10:
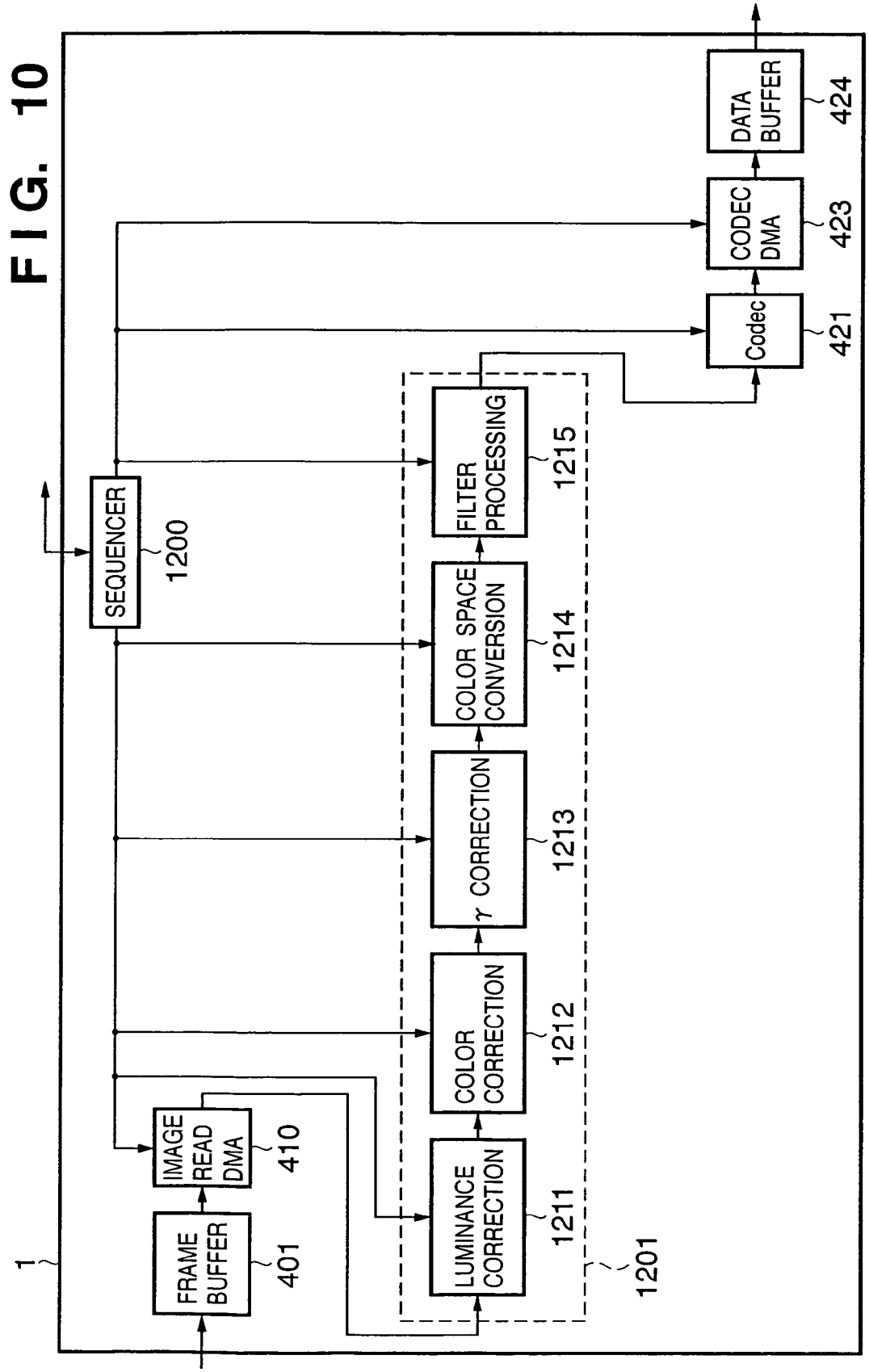
FIG. 10 is a block diagram showing details of an image processing section according to a Fourth Embodiment.

The Third Embodiment connects the respective correction processing sections in the image correction execution section 1001 in series like a pipeline, provides the flag processing section 1010 for adding a flag indicating whether or not to carry out each correction process and a parameter indicating an amount of each type of correction before the image correction execution section 1001. Using such a structure, the Third Embodiment intends to simplify data flow control and shorten the processing time. However, by appropriately arranging the respective correction processing sections and incorporating the part which carries out flag processing in the control sequencer section, it is possible to further simplify the inner structure of the image processing section 1. As shown in FIG. 10, according to the Fourth Embodiment, a function of turning ON/OFF the functions of the respective correction processing sections in the image correction execution section is incorporated in a control sequencer section 1200 and the respective correction processing sections in an image correction execution section 1201 are connected in series like a pipeline. By eliminating the flag processing section in this way, it is possible to further save the space of the chip area and save power.

FIG. 10 is a block diagram showing details of the image processing section 1 according to the Fourth Embodiment. In FIG. 10, the control sequencer section 1200 carries out processing of setting read/write areas from/to each DMA section, turning ON/OFF the function of each correction processing section and instructing a CODEC section 421 to change the encoding system. The image correction execution section 1201 is provided with various processing blocks connected like a pipeline. A luminance correction section 1211 determines whether or not to execute luminance correction processing according to an instruction from the control sequencer section 1200. A color correction section 1212 determines whether or not to execute color correction processing according to an instruction from the control sequencer section 1200. A γ correction section 1213 determines whether or not to execute γ correction processing according to an instruction from the control sequencer section 1200. A color space conversion section 1214 determines whether or not to execute color space conversion processing according to an instruction from the control sequencer section 1200. A filter processing section 1215 determines whether or not to execute filter processing according to an instruction from the control sequencer section 1200. When each of the sections 1211 to 1215 receives an instruction that no processing should be executed (OFF of the function) from the control sequencer section 1200, each section carries out no processing and hands over the data to the posterior sections.

Figure 11:
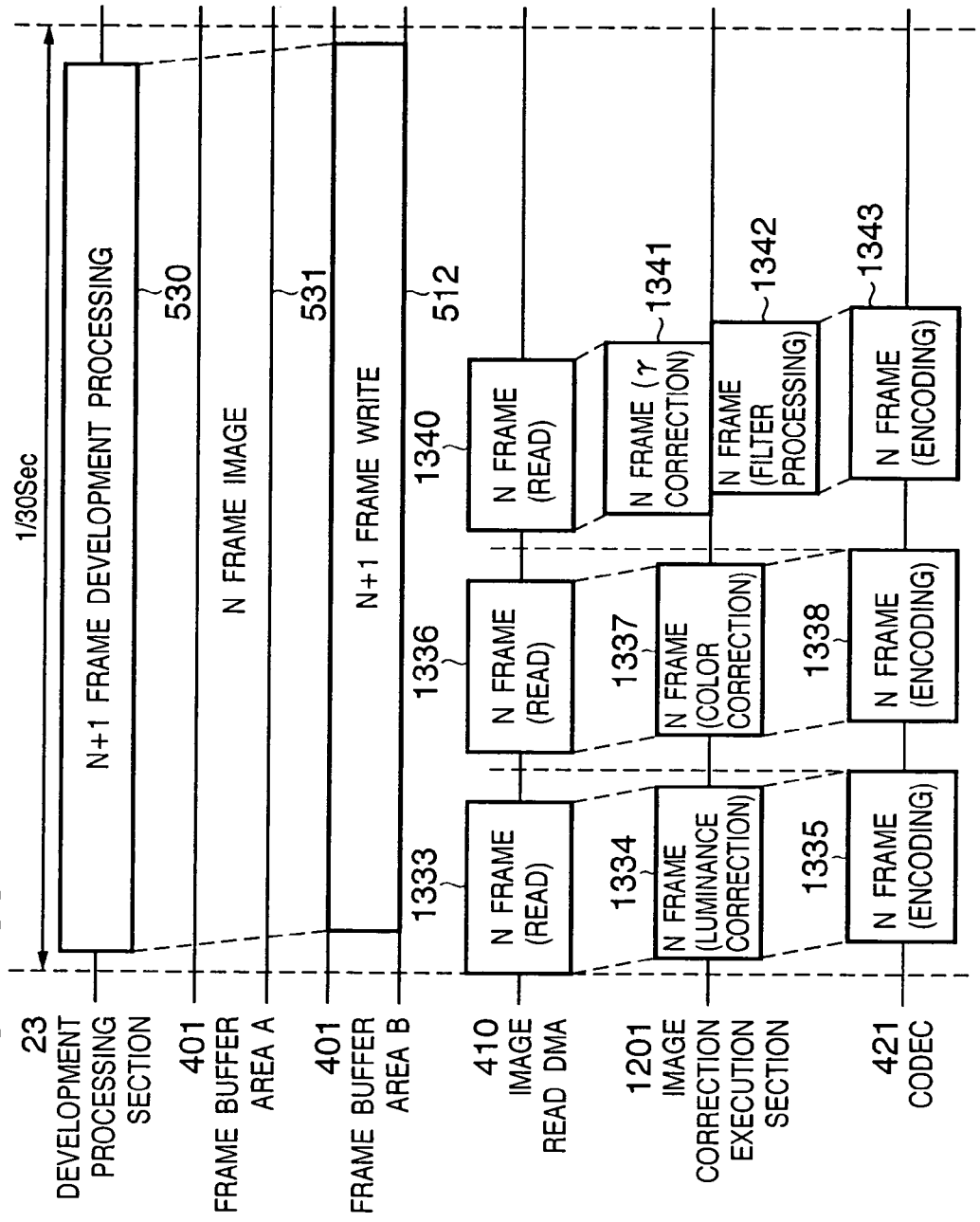
FIG. 11 illustrates internal operations of respective processing sections of the image processing section according to the Fourth Embodiment.

FIG. 11 shows internal operations of the respective processing sections of the image processing section 1 according to the Fourth Embodiment.

In the structure shown in FIG. 10, internal operations of the image processing section 1 according to the Fourth Embodiment when requests from three display apparatuses are processed will be explained with reference to FIG. 11.

The control sequencer section 1200 decides processing steps concerning the contents of correction processing from three different display apparatuses based on the information from a processing performance decision section 31. This embodiment will explain a case where a first display apparatus requests luminance correction, a second display apparatus requests color correction and a third display apparatus requests y correction and filter processing.

First, the control sequencer section 1200 instructs the luminance correction processing section 1211 to execute luminance correction and a processing amount parameter for the first display apparatus. On the other hand, the control sequencer section 1200 instructs the color correction processing section 1212, γ processing section 1213, color space conversion section 1214 and filter processing section 1215 not to execute processing but transfer data to the next processing section. When a development processing section 23 starts to output an N+1 frame image for 1 vertical scanning period, a write from one area (area B) of a frame buffer 401 is started (512). Simultaneously with the start of this write, an image read DMA section 410 is instructed to read an N frame image 531 from the other area (area A) of the frame buffer 401. The image read DMA section 410 reads the N frame image 531 (N frame read processing 1333) and inputs the N frame image 531 to the luminance correction section 1211.

Since the luminance correction section 1211 has received an instruction for carrying out luminance correction processing from the control sequencer section 1200, it carries out luminance correction processing according to the specified parameter on the input image data (N frame luminance correction processing 1334). The image subjected to luminance correction by the N frame luminance correction processing 1334 is input to the color correction processing section 1212 which is the next correction processing, but since an instruction for operation OFF has been received from the control sequencer section 1200, the image is subjected no processing and output to the γ correction processing section 1213 that follows. Likewise, the γ correction processing section 1213, color space processing section 1214 and filter processing section 1215 have also received an instruction for operation OFF from the control sequencer section 1200, and therefore the frame image is output to a CODEC section 421 without receiving any processing. The CODEC section 421 encodes the image subjected to luminance correction based on the encoding system instructed by the control sequencer section 1200 (N frame encoding processing 1335). The encoded data obtained is written into a data buffer 424 by a data buffer DMA section 423 and a network control section 30 carries out transmission processing on the display apparatus.

The control sequencer section 1200 which detects that the encoding processing 1335 by the CODEC section 421 is completed instructs the color correction processing section 1212 to execute color correction and a processing amount parameter to generate image data for the second display apparatus. Furthermore, the control sequencer section 1200 gives an instruction for turning OFF the operation to other processing sections (luminance correction processing section 1211, γ processing section 1213, color space conversion section 1214, filter processing section 1215). Then, the control sequencer section 1200 instructs an image read DMA section 410 to read the N frame image 531 from the area A of the frame buffer 401. The image read DMA section 410 reads an N frame image (N frame read processing 1336) and inputs the read frame image to the luminance correction processing section 1211.

The luminance correction processing section 1211 has received an instruction for operation OFF from the control sequencer section 1200, and therefore it hands over the data to the color correction processing section 1212 that follows without carrying out any processing on the data. The color correction processing section 1212 has received an instruction for carrying out color correction processing from the control sequencer section 1200, and therefore it carries out color correction processing according to the specified parameter on the input image data (N frame color correction processing 1337). The N frame image subjected to color correction is input to the γ correction processing section 1213 which is the γ correction processing that follows, while the γ correction section 1213 has received an instruction for operation OFF from the control sequencer section 1200, and therefore the N frame image is output without being subjected to any processing. Likewise, the color space processing section 1214 and filter processing section 1215 have also received an instruction for operation OFF from the control sequencer section 1200, the N frame image is output to the CODEC section 421 without being subjected to the respective processes. The CODEC section 421 encodes the input N frame image subjected to color correction (encoding processing 1338) based on the encoding system instructed by the control sequencer section 1200 and generates N frame encoded data. The N frame encoded data is written by the data buffer DMA section 423 in the data buffer 424 and the network control section 30 carries out transmission processing on the display apparatus.

The control sequencer section 1200 which has detected that the encoding processing by the CODEC section 421 is completed further generates image data for the third display apparatus. For this purpose, the control sequencer section 1200 gives the γ correction processing section 1213 an instruction of executing γ correction and a processing amount parameter, gives filter processing section 1215 an instruction of executing filter processing and a processing amount parameter. The control sequencer section 1200 gives an instruction for operation OFF to the other processing sections (luminance correction section 1211, color correction section 1212 and color space conversion section 1214). Then, the control sequencer section 1200 instructs the image read DMA section 410 to read the N frame image 531 from the area A of the frame buffer 401. The image read DMA section 410 reads the N frame image (N frame read processing 1340) and inputs the read frame image to the luminance correction section 1211.

The luminance correction section 1211 has received an instruction for operation OFF from the control sequencer section 1200, and therefore it inputs the N frame image to the color correction section 1212 that follows without carrying out any processing on the image. Likewise, the color correction section 1212 has also received an instruction for operation OFF from the control sequencer section 1200, and therefore it hands over the image data to the γ correction section 1213 that follows without carrying out any processing on the image data. The γ correction section 1213 has received an instruction for executing γ correction processing from the control sequencer section 1200, and therefore it executes γ correction processing according to the specified parameter on the input image data (N frame γ correction processing 1341). The image data subjected to γ correction are successively input to the next color space conversion section 1214. The color space conversion section 1214 has received an instruction for operation OFF from the control sequencer section 1200, and therefore it successively outputs the input image data as is to the filter processing section 1215.

The filter processing section 1215 has received an instruction for executing filter processing from the control sequencer section 1200, and therefore it carries out filter processing according to the specified parameter on the input image data (N frame filter processing 1342). The image data output from the filter processing section 1215 are successively input to the CODEC section 421, and encoded based on the encoding system instructed from the control sequencer section 1200. Thus, N frame encoded data 1343 is generated. The N frame encoded data 1343 is written into the data buffer 424 by the data buffer DMA section 423 and transmission processing is carried out on the display apparatus by the network control section 30.

As has been explained above, it is possible to save the space of the chip area and save power by realizing a pipeline processing system based on the optimized arrangement of the correction processing sections while realizing effects similar to those of the First Embodiment.

The Fourth Embodiment can also realize processing of extracting at a desired angle of view by providing a structure related to the work memory 425 as shown in the Third Embodiment.

Fifth Embodiment

The First Embodiment and Second Embodiment have the inner structure of the image processing section 1 in which the respective image correction processes are arranged in parallel as shown in FIG. 4 and image data is distributed by the demultiplexer section to a specified correction process. Furthermore, the Third Embodiment and Fourth Embodiment have the structure in which the respective processing sections and flag processing section are connected like a pipeline to carry out correction processing.

The Fifth Embodiment controls data input/output to/from the respective correction processing sections and the buffer by means of DMA by the control sequencer to thereby realize operations and effects similar to those in the above described embodiments.

Figure 12:
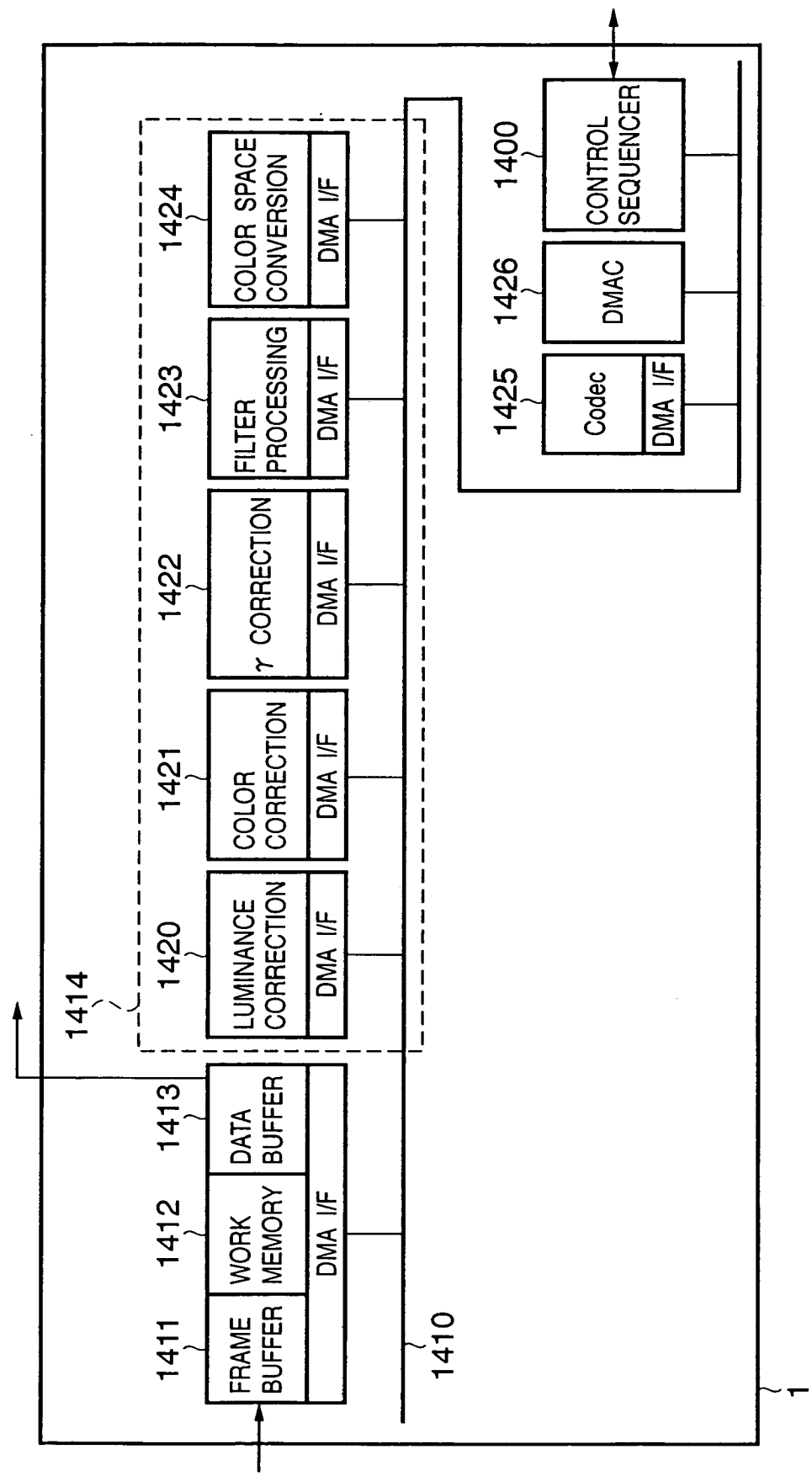
FIG. 12 is a block diagram showing details of an image processing section according to a Fifth Embodiment.

FIG. 12 is a block diagram showing details of an image processing section 1 according to the Fifth Embodiment. In FIG. 12, a control sequencer section 1400 controls data input/output to/from each processing section and a buffer by means of DMA according to an instruction from a processing performance decision section 31. A data bus 1410 connects the respective processing sections and buffer. A frame buffer 1411 stores a frame image for 1 vertical scanning period output from a development processing section 23 and is connected to other processing sections in the image processing section 1 through a DMA interface. A work memory 1412 is a work memory which temporarily records image data processed by an arbitrary processing section and connected to the other processing sections in the image processing section 1 through the DMA interface. A data buffer 1413 stores encoded data output from a CODEC section 1425 and outputs the stored encoded data to a network control section 30. The data buffer 1413 is connected to the other processing sections in the image processing section 1 through the DMA interface.

A luminance correction section 1420 included in an image correction execution section 1414 performs data input/output to/from a color correction section 1421, γ correction section 1422, a filter processing section 1423 and a color space conversion section 1424 and the CODEC section 1425 through their respective DMA interfaces. A DMAC section 1426 is a direct memory access controller, monitors priority of each DMA interface in the image processing section 1, a data input/output sequence and passing of addresses and executes/stops DMA operations based on settings from the control sequencer 1400.

Figure 13:
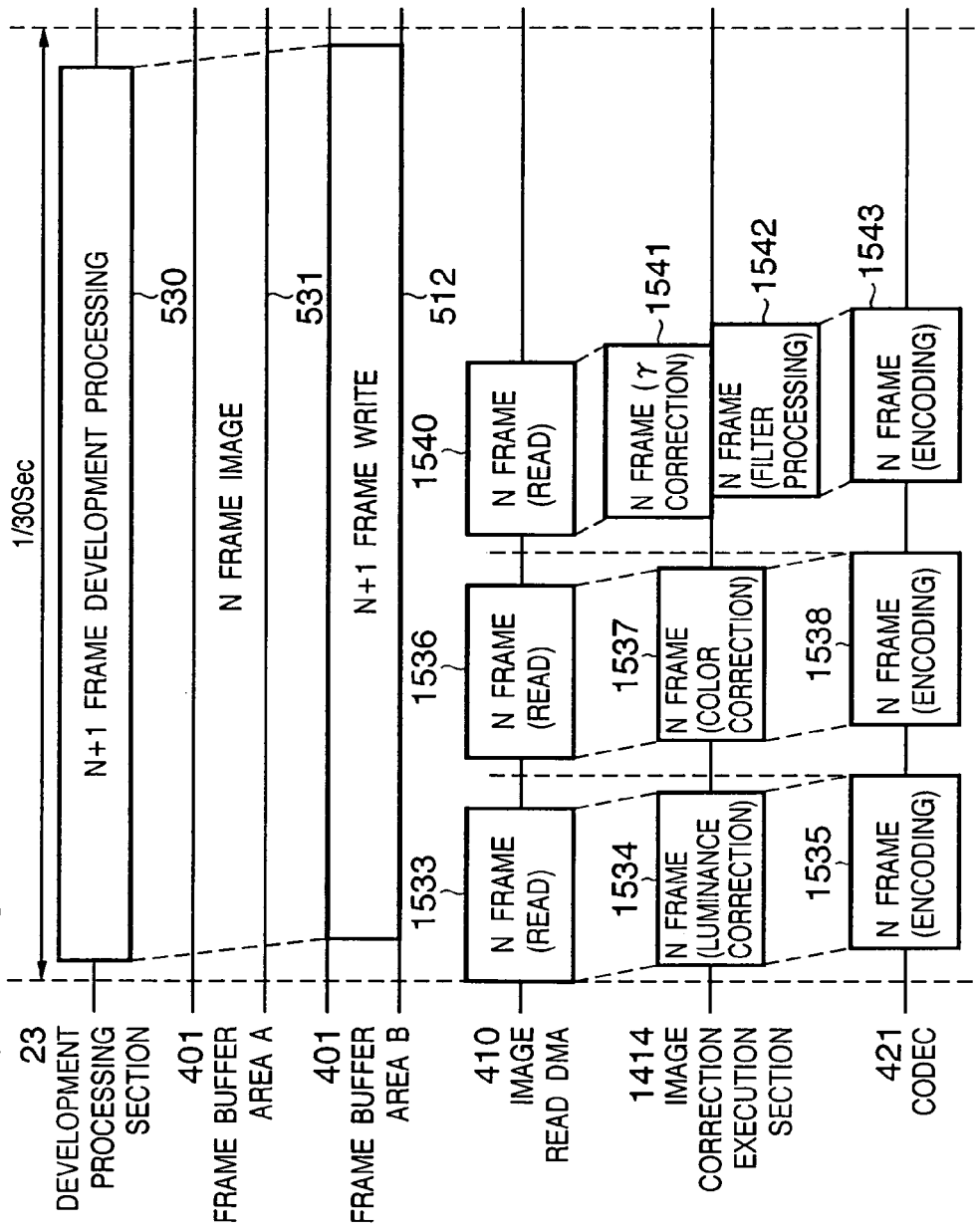
FIG. 13 illustrates internal operations of the respective processing sections of the image processing section according to the Fifth Embodiment.

FIG. 13 shows internal operations of the respective processing sections of the image processing section 1 according to the Fifth Embodiment. Internal operations of the image processing section 1 having the above described structure according to the Fifth Embodiment when requests from three display apparatuses are processed will be explained using FIG. 12 and FIG. 13.

The control sequencer section 1400 successively reads an N frame image 531 stored in a frame buffer 401A in arbitrary data amount units through DMA transfers and directly inputs the N frame image 531 to the luminance correction section 1420 for the first display apparatus. The luminance correction section 1420 whose operation has been preset according to an instruction from the control sequencer section 1400 processes data input through DMA transfers in units of an arbitrary data amount and successively outputs the processed data to the CODEC section 1425 through DMA transfers. The CODEC section 1425 encodes the data in units of arbitrary data amount input and DMA transfers the data to the data buffer section 1413. These series of DMA transfers are continued until processing on all N frame images is completed.

When the completion of encoding processing 1535 on the entire N frame image is detected, the control sequencer section 1400 carries out processing for the second display apparatus. That is, the control sequencer section 1400 successively reads the N frame image 531 stored in the frame buffer 401A in units of an arbitrary data amount through DMA transfers and directly inputs the data to the color correction section 1421 again. The color correction section 1421 whose operation has been preset through an instruction from the control sequencer section 1400 processes the data input through DMA transfers in units of an arbitrary data amount and successively outputs the data to the CODEC section 1425 through DMA transfers. The CODEC section 1425 encodes the data in units of the arbitrary data amount input and DMA transfers the data to the data buffer section 1413. These series of DMA transfers are continued until processing on the entire N frame image is completed.

Furthermore, when the completion of encoding processing 1538 on the entire N frame image is detected, the control sequencer section 1400 successively reads the N frame image 531 stored in the frame buffer 401A in units of an arbitrary data amount through DMA transfers for the third display apparatus. The image data read is directly input to the γ correction section 1422. The γ correction section 1422 whose operation has been preset according to an instruction from the control sequencer section 1400 processes the data input through DMA transfers in units of an arbitrary data amount and successively outputs the processed data to the filter processing section 1423 through DMA transfers. The filter processing section 1423 whose operation has been preset according to an instruction from the control sequencer section 1400 processes the data input through DMA transfers in units of an arbitrary data amount and successively outputs the processed data to the CODEC section 1425 through DMA transfers. The CODEC section 1425 encodes data in units of an arbitrary data amount input and DMA transfers it to the data buffer section 1413. These series of DMA transfers are continued until processing on the entire N frame image is completed.

The above described series of processes are repeated for every vertical scanning period and the encoded data stored in the work memory 1413 is output to the network control section 30, and therefore it is possible to output three different encoded motion images over a network.

The Fifth Embodiment stores data subjected to image processing under DMA control in the work memory 1412 and transfers the data to the other processing sections, and can thereby generate image data subjected to a plurality of processes. Furthermore, if a specified range is extracted from the image data stored in the work memory 1412 and supplied to the CODEC section 1425, it is possible to obtain encoded image data extracted at a desired angle of view.

As has been explained above, it is also possible to realize effects similar to those in other embodiments by controlling the respective processing sections through DMA transfers.

Sixth Embodiment

In the First Embodiment and Second Embodiment, the image processing section 1 has the inner structure in which the respective image correction processes are arranged in parallel as shown in FIG. 4 and image data is distributed by the demultiplexer section to a specified correction process. Furthermore, the Third Embodiment and Fourth Embodiment have the structure in which the respective processing sections and flag processing section are connected like a pipeline to carry out correction processing. Furthermore, the Fifth Embodiment controls various correction processing sections through DMA and thereby realizes operations and effects similar to those in the other embodiments.

A Sixth Embodiment provides the respective correction processing sections with means (concurrent output control section 1610) for supplying image data read to a plurality of correction processing sections and CODEC section simultaneously. This structure makes it possible to realize operations and effects similar to those of the above described embodiments, improve the correction/encoding processing efficiency per a predetermined unit time and reduce the rate of use of memory when similar processing is realized.

Figure 14:
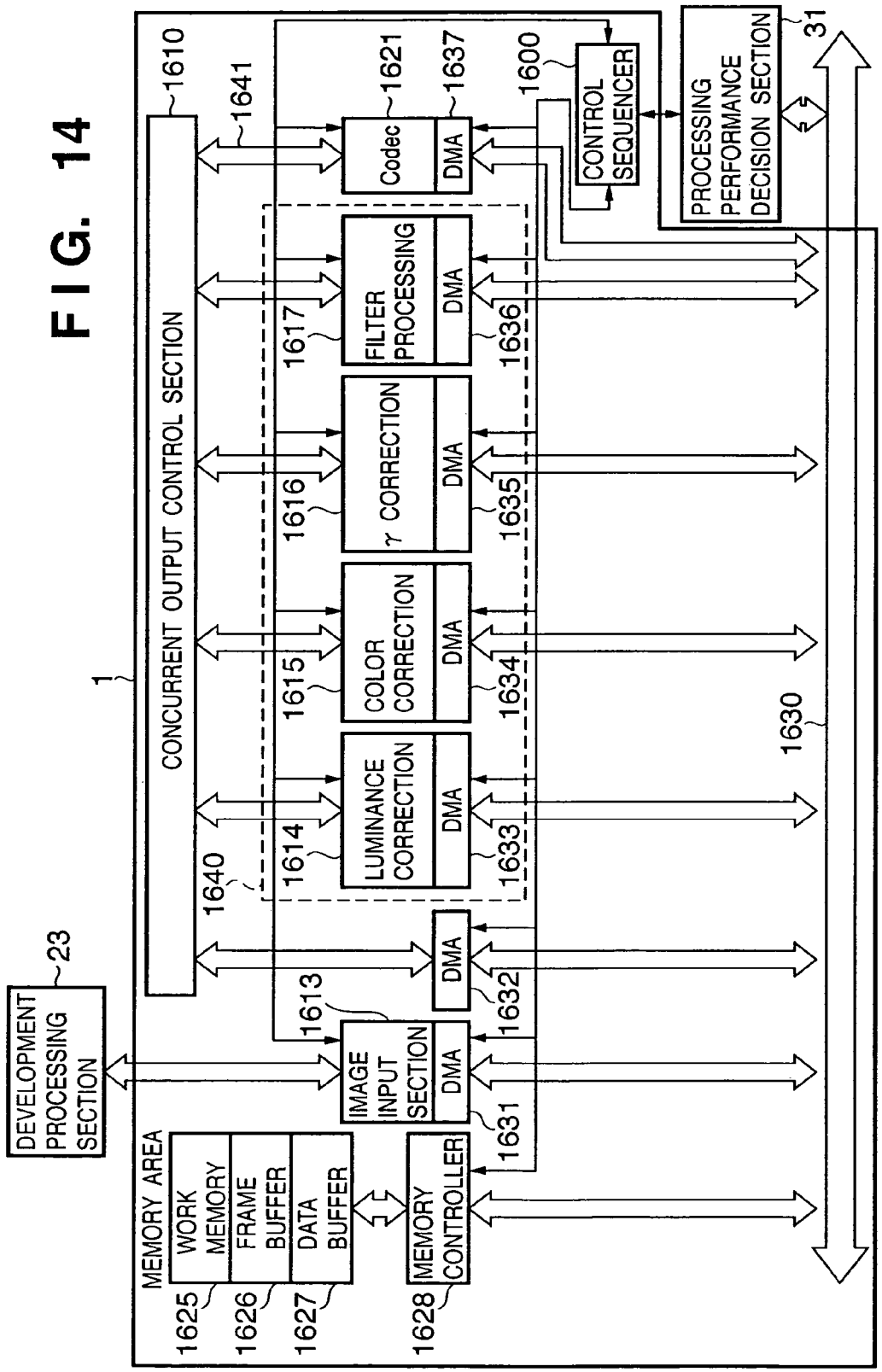
FIG. 14 is a block diagram showing details of an image processing section according to a Sixth Embodiment.

FIG. 14 is a block diagram showing details of the image processing section 1 according to the Sixth Embodiment. In FIG. 14, a control sequencer section 1600 controls input/output of data to/from various processing sections and buffer through DMA according to an instruction from a processing performance decision section 31. A data bus 1630 connects the processing sections and buffer. A frame image for 1 vertical scanning period output from a development processing section 23 is input to an image input section 1613 and written into a frame buffer 1626 by an image input section DMA 1631. The frame buffer 1626 is connected to other processing sections in an image processing section 1 through a memory controller 1628. A work memory 1625 is a work memory which temporarily stores image data subjected to processing through an arbitrary processing section and connected to the other processing sections in the image processing section 1 through the memory controller 1628. A data buffer 1627 stores encoded data output from a CODEC section 1621 and outputs the stored encoded data to the processing performance decision section 31 in a network control section 30. The data buffer 1627 is also connected to the other processing sections in the image processing section 1 through the memory controller 1628.

Data is input/output to/from a luminance correction section 1614, a color correction section 1615, a γ correction section 1616 and a filter processing section 1617, a concurrent output control section 1610, a CODEC section 1621 included in an image correction execution section 1640 through the DMAs 1633 to 1637. Each DMA is a direct memory access controller and controls priority with respect to each DMA in the image processing section 1, data input/output sequence and passing of addresses according to a setting from the control sequencer 1600 and controls execution/stop of the DMA operation.

The concurrent output control section 1610, processing sections 1614 to 1617 included in the image correction execution section 1640 and CODEC section 1621 are connected by interfaces 1641 independently of the DMA connections to the data bus 1630. A DMA1632 of the concurrent output control section reads image data from the work memory 1625, frame buffer 1626 and data buffer 1627. The image data read is concurrently supplied to a plurality of processing sections of the processing sections and CODEC section 1621 selected according to settings from the control sequencer 1600. Furthermore, image data subjected to image processing through any one of the processing sections and CODEC section 1621 is supplied to the concurrent output control section 1610 through the above described independent interfaces 1641. The concurrent output control section 1610 concurrently supplies image data to a plurality of processing sections of the processing sections and CODEC section 1621 according to settings from the control sequencer 1600.

Figure 15:
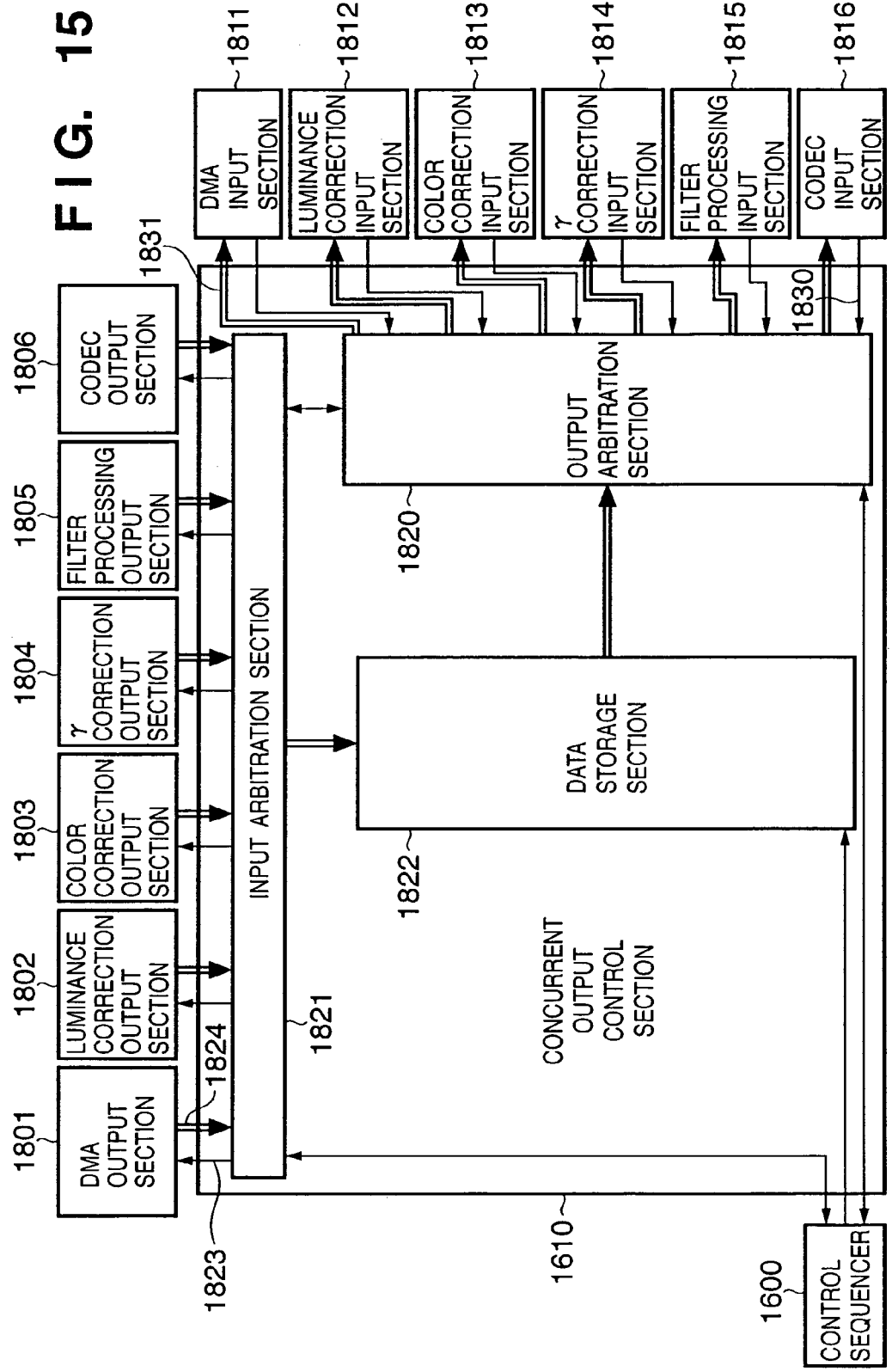
FIG. 15 is a block diagram showing details of a concurrent output control section according to a Sixth Embodiment.

FIG. 15 is a block diagram showing the internal structure of the concurrent output control section 1610. In FIG. 15, an input arbitration section 1821 is connected to the concurrent output control section DMA 1632 and output sections 1801 to 1806 of the processing sections 1633 to 1637. The output sections 1801 to 1806 are the output sections of the concurrent output control section DMA 1632, luminance correction section 1614, color correction output section 1615, γ correction output section 1616, filter processing section 1617 and CODEC section 1621 respectively. Data output ports 1824 and output BUSY signals 1823 are connected between the input arbitration section 1821 and respective output sections 1801 to 1806. An output BUSY signal is output from the input arbitration section 1821 to each of the output sections 1801 to 1806.

An output arbitration section 1820 is connected to input sections 1811 to 1816 of the concurrent output control section DMA 1632 and the respective processing sections 1633 to 1637. The input sections 1811 to 1816 are the input sections of the concurrent output control section DMA 1632, luminance correction section 1614, color correction output section 1615, γ correction output section 1616, filter processing section 1617 and CODEC section 1621 respectively. Data output ports 1831 and input BUSY signals 1830 are connected between the output arbitration section 1820 and the respective input sections 1811 to 1816. An input BUSY signal is output from each of the input sections 1811 to 1816 to the output arbitration section 1820.

The independent interface 1641 shown in FIG. 14 is constructed of these data output port 1824, output BUSY signal 1823, data input port 1831 and input BUSY signal 1830.

The input arbitration section 1821 selects an output section to which data is input according to a setting from the control sequencer 1600. Furthermore, the input arbitration section 1821 controls the output BUSY signal 1823 while deciding a situation of each input BUSY signal 1830 input to the output arbitration section 1820 to thereby control data output of each output section. Data input from the data output port 1824 is temporarily stored in a data storage section 1822 through the input arbitration section 1821. The data stored in the data storage section 1822 is output to a plurality of output sections selected from among the input sections 1811 to 1816 connected to the output arbitration section 1820 according to settings from the control sequencer 1600 through the output arbitration section 1820.

The above described independent interface 1641 has a structure with the input port and output port separated from each other, but a similar function can be realized even when the input and output ports are integrated by carrying out time-division control.

Furthermore, this concurrent output control section 1610 is designed to be able to turn ON/OFF each input/output port according to a setting from the control sequencer 1600. For this reason, when the number of input sections and output sections is increased or decreased, it is possible to construct the concurrent output control section 1610 so as to have many ports beforehand to match the number of ports to be operated by turning OFF unused ports. Furthermore, by connecting a plurality of CODEC sections to the output arbitration section 1820, it is possible to meet more network output requests.

Figure 16:
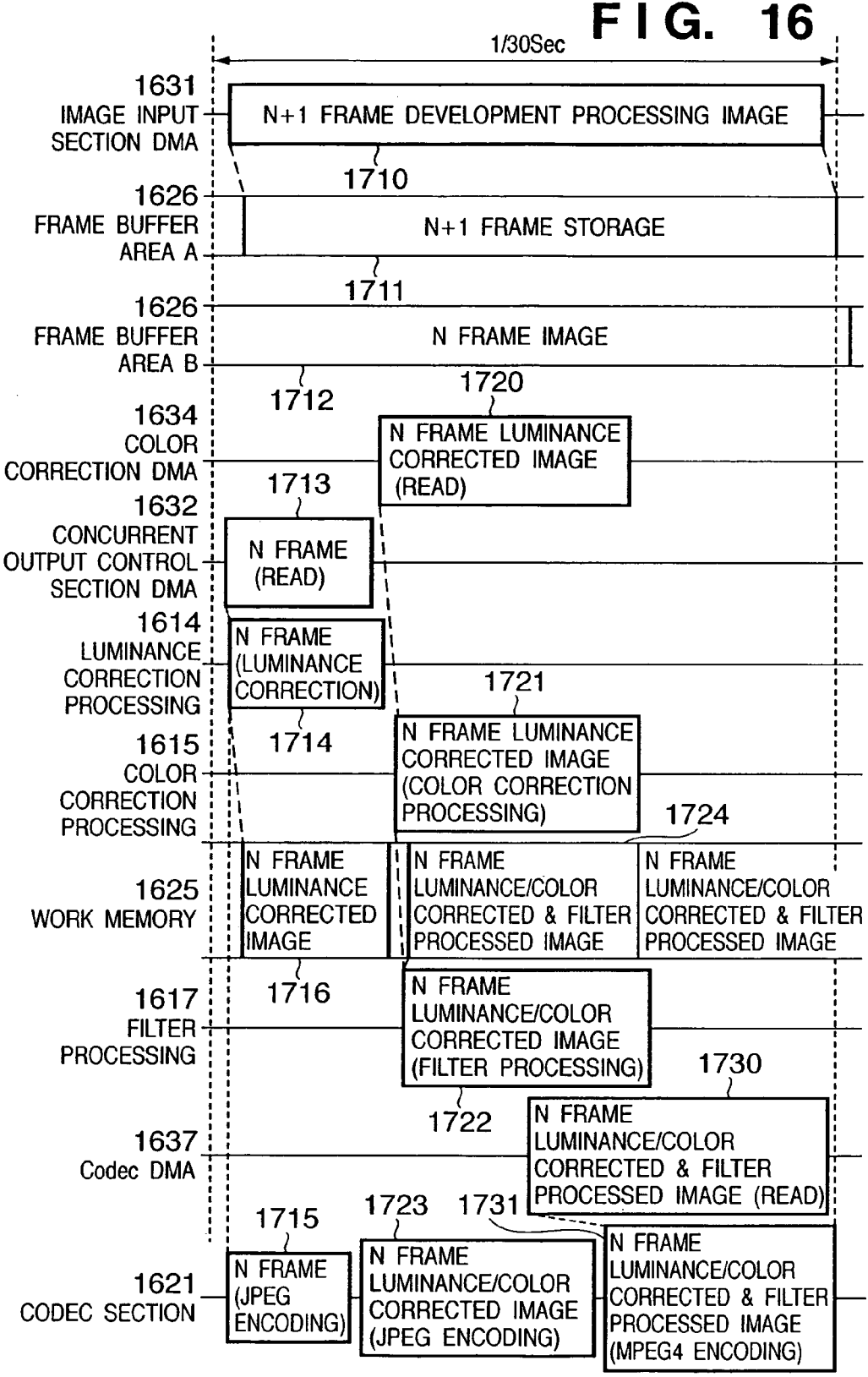
FIG. 16 illustrates internal operations of respective processing sections of the image processing section according to the Sixth Embodiment.

FIG. 16 illustrates internal operations of the respective processing sections of the image processing section 1 according to the Sixth Embodiment. The internal operations of the image processing section 1 according to the Sixth Embodiment in the above described structure when requests from three display apparatuses are processed will be explained using FIG. 14 to FIG. 16.

The control sequencer 1600 inputs the Nth frame image (hereinafter referred to as "N frame image") 1712 stored in an area B of the frame buffer 1626 through a transfer of the concurrent output control section DMA 1632 for the first display apparatus. In this transfer, N frame data is successively input to the concurrent output control section 1610 in units of an arbitrary data amount through the DMA output section 1801. Then, the same data is output to the luminance correction input section 1812 in the luminance correction section 1614 and CODEC input section 1816 in the CODEC section 1621. The luminance correction section 1614 whose operation has been preset according to an instruction from the control sequencer section 1600 processes input data in units of an arbitrary data amount and successively outputs the processed data to the work memory 1625 through DMA transfers. The CODEC section 1621 whose operation has been preset according to an instruction from the control sequencer section 1600 encodes data in units of an arbitrary data amount input and DMA transfers the result to the data buffer 1627. These series of DMA transfers are continued until the processing on the entire N frame read image 1713 is completed.

When the control sequencer 1600 detects the completion of the luminance correction processing 1714 and encoding processing 1715 on the entire N frame image, it starts processing on the second display apparatus. First, the control sequencer 1600 successively reads the luminance correction image 1716 of the N frame stored in the work memory 1625 through the transfer of the color correction section DMA 1634 in units of an arbitrary data amount and directly inputs the luminance correction image to the color correction section 1615. The color correction section 1615 whose operation has been preset according to an instruction from the control sequencer section 1600 subjects the data input through the DMA transfer to color correction processing 1721 in units of an arbitrary data amount. The results are successively output from the color correction output section 1803 and input to the concurrent output control section 1610. The concurrent output control section 1610 is preset by the control sequencer 1600 in such a way that the data is output to the CODEC section 1621 and filter processing section 1617. Therefore, the concurrent output control section 1610 carries out processing of outputting the data input from the color correction output section 1803 to the CODEC section 1621 and filter processing section 1617. The CODEC section 1621 subjects luminance/color correction image data to encoding 1723 in units of an arbitrary data amount input and transfers the result to the data buffer 1627 through the DMA 1637. These series of DMA transfers are continued until processing on the entire N frame image is completed.

The filter processing section 1617 carries out filter processing on the luminance/color correction image input from the color correction processing section 1615 in units of an arbitrary data amount and successively transfers data 1722 whose processing has been completed to the work memory 1625 by means of DMA 1637. The transferred data is stored in the work memory 1625 as an N frame luminance/color correction/filter processing image 1724. These series of DMA transfers are continued until processing on the entire N frame luminance correction image 1716 is completed.

Furthermore, when the control sequencer section 1600 detects the completion of the encoding processing 1723 and memory write 1724 after color correction processing on the entire N frame luminance correction image 1716, it starts processing for the third display apparatus. The luminance/color correction/filter processing image 1724 of the N frame stored in the work memory 1625 is successively read by the CODEC section DMA 1637 in units of an arbitrary data amount (1730). The CODEC section 1621 encodes the luminance/color correction/filter processing image 1724 of the read N frame and transfers the result to the data buffer 1627 through the data CODEC section DMA 1637. These series of DMA transfers are continued until processing on the luminance/color correction/filter processing image 1724 of the entire N frame is completed.

The above described series of processes are repeated for every vertical scanning period, encoded data stored in the data buffer 1627 is output to the processing performance decision section 31 in the network control section 30, and therefore it is possible to output three different encoded motion images through a network.

The Sixth Embodiment has explained the case where there is only one CODEC section 1621, but it is possible to meet multiple network requests by connecting a plurality of CODECs in the same way as the CODEC section 1621.

As has been explained above, the Sixth Embodiment provides the concurrent output control section 1610 and allows the same data to be supplied to a plurality of processing sections, memory and CODEC section. This makes it possible to realize operations and effects similar to those of the above described embodiments, improve the correction/encoding processing efficiency per a predetermined unit time and reduce the rate of use of memory when similar processing is realized.

Seventh Embodiment

According to the Sixth Embodiment, the image processing section 1 has the internal structure in which data is supplied to each image correction process through DMA as shown in FIG. 14. A Seventh Embodiment adopts a structure in which various image correction processes are arranged in parallel and a demultiplexer section distributes image data to a specified correction process and also provides means for supplying image data read into each correction processing section to a plurality of correction processing sections and CODEC section simultaneously. This structure realizes operations and effects similar to those in the Sixth Embodiment.

Figure 17:
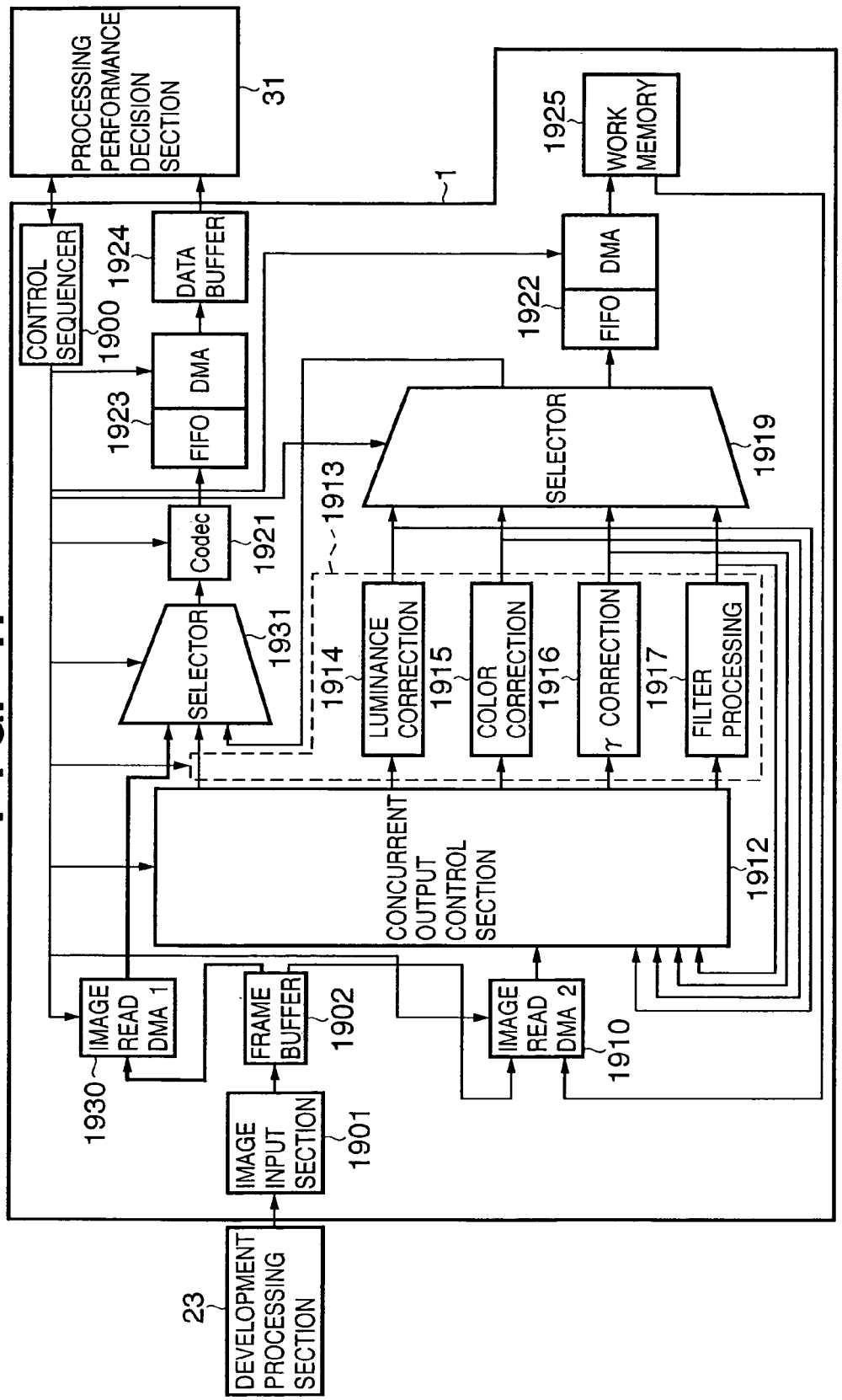
FIG. 17 is a block diagram showing details of an image processing section according to a Seventh Embodiment.

FIG. 17 is a block diagram showing details of an image processing section 1 according to the Seventh Embodiment. In FIG. 17, a control sequencer 1900 controls data input/output to/from respective processing sections and a buffer according to instructions from a processing performance decision section 31. A frame buffer 1902 stores a frame image for 1 vertical scanning period output from a development processing section 23 through an image input section 1901. A work memory 1925 is a work memory which temporarily stores image data processed by an arbitrary processing section and connected to the other processing sections in the image processing section 1 through a work memory write DMA 1922 and a second image read DMA 1910. A data buffer 1924 stores encoded data output from a CODEC section 1921 and outputs the stored encoded data to the processing performance decision section 31 in a network control section 30.

A concurrent output control section 1912 and a luminance correction section 1914, a color correction section 1915, a γ correction section 1916 and a filter processing section 1917 included in an image correction execution section 1913 and the CODEC section 1921 are connected by independent interfaces as in the case of the Sixth Embodiment. The second image output DMA 1910 reads image data from the work memory 1925 and frame buffer 1902 and supplies the image data to a plurality of processing sections selected by a setting of the control sequencer 1900 simultaneously. This image data is supplied to a plurality of processing sections 1914 to 1917 in the unit 1913 and a processing section selected by the CODEC section 1921. Furthermore, image data subjected to image processing by any one of the processing sections 1914 to 1917 and CODEC section 1921 is supplied to the concurrent output control section 1912 through input/output ports (2124, 2131) which will be described later in FIG. 18. The concurrent output control section 1912 can supply image data to a plurality of processing sections selected according to settings from the control sequencer 1900 from among the processing sections 1914 to 1917 and CODEC section 1921 simultaneously.

FIG. 18 is a block diagram showing the internal structure of the concurrent output control section 1912. In FIG. 18, data output ports 2124 of output sections 2101 to 2106 are connected to data output selection switches (hereinafter referred to as "SW") 2001 respectively. The output sections 2101 to 2106 are the output sections of the second image read DMA 1910, luminance correction section 1914, color correction output section 1915, γ correction output section 1916, filter processing section 1917 and CODEC section 1921. Furthermore, data input ports 2131 of input sections 2111 to 2116 are connected to a SW2001 group. The input sections 2111 to 2116 are the input sections of the second image read DMA 1910, luminance correction section 1914, color correction output section 1915, γ correction output section 1916, filter processing section 1917 and CODEC section 1921. The SW2001 group is connected to each input/output section in the form of a cross bar switch. However, unlike a conventional cross bar switch, the SW2001 is constructed in such a way that a plurality of input sections specified by the control sequencer 1900 are specified as output destinations for one input from each output section.

FIG. 19 shows internal operations of each processing section of the image processing section 1 according to the Seventh Embodiment. Internal operations of the image processing section 1 in the above described structure according to the Seventh Embodiment when requests from three display apparatuses are processed will be explained using FIG. 17 to FIG. 19.

The control sequencer section 1900 carries out image processing for the first display apparatus first. The control sequencer section 1900 successively inputs the image of an Nth frame (hereinafter referred to as "N frame image") 2012 stored in an area B of the frame buffer 1902 to the concurrent output control section 1912 through the second image read DMA 1910 in units of an arbitrary data amount. The concurrent output control section 1912 outputs the same data to the luminance correction input section 2112 in the luminance correction section 1914 and CODEC input section 2116 of the CODEC section 1921. The luminance correction section 1914 whose operation has been preset according to an instruction from the control sequencer 1900 processes input data in units of an arbitrary data amount and successively transfers the processed data to the work memory 1925 by DMA 1922. Furthermore, the CODEC section 1921 whose operation has been preset according to an instruction from the control sequencer 1900 encodes image data input in units of an arbitrary data amount and transfers the result to the data buffer section 1924 through the DMA 1923. These series of DMA transfers are continued until processing on the entire N frame read image 2013 is completed.

When the control sequencer section 1900 detects the completion of luminance correction processing 2014 and encoding processing 2015 of the entire N frame image, it carries out processing for the second display apparatus. First, the control sequencer section 1900 successively reads the N frame luminance correction image 2016 stored in the work memory 1925 through a transfer of the second image read DMA 1910 in units of an arbitrary data amount and directly input it to the color correction section 1915. The color correction section 1915 whose operation has been preset according to an instruction from the control sequencer section 1900 subjects the data input through the DMA transfer to color correction processing (2021) in units of an arbitrary data amount. It successively outputs the result from the color correction output section 2103 to the concurrent output control section 1912.

The concurrent output control section 1912 is preset by the control sequencer 1900 so as to output the data from the color correction output section 2103 to the CODEC section 1921 and filter processing section 1917. Thus, the concurrent output control section 1912 outputs the data input from the color correction output section 2103 to the CODEC input section 2116 and filter processing input section 2115. The CODEC section 1921 encodes (2023) the data input in units of an arbitrary data amount and transfers the data to the data buffer section 1924 through the DMA 1923. These series of DMA transfers are continued until processing on the entire N frame image is completed.

On the other hand, the filter processing section 1917 carries out filter processing (2022) in units of an arbitrary data amount input and successively transfers data (N frame luminance/color correction/filter processing image 2022) whose processing has been completed to the work memory 1925 through a DMA 1922. In this way, the N frame luminance/color correction/filter processing image 2024 is stored in the work memory 1925. These series of DMA transfers are continued until processing on the entire N frame luminance correction image 2016 is completed.

Furthermore, when the control sequencer 1900 detects the completion of a memory write 2024 after encoding processing 2023 and color correction processing of the entire N frame luminance correction image 2016, it starts processing for the third display apparatus. First, it successively reads the N frame luminance/color correction/filter processing image 2024 stored in the work memory 1925 through the second image read DMA 1910 in units of an arbitrary data amount (2030) and transfers it to the CODEC section 1921. The CODEC section 1921 encodes the transferred data and transfers the encoded data to the data buffer section 1927 through a CODEC section DMA 1923. These series of DMA transfers are continued until processing on the entire N frame luminance/color correction/filter processing image 2024 is completed.

The above described series of processes are repeated for every vertical scanning period, encoded data stored in the data buffer 1924 is output to the processing performance decision section 31 in the network control section 30, and therefore it is possible to output three different encoded motion images through a network.

As explained above, the Seventh Embodiment provides the concurrent output control section 1912 and thereby allows the same data to be supplied to a plurality of processing sections, memory and CODEC section. This makes it possible to realize operations and effects similar to those of the above described embodiments, improve the correction/encoding processing efficiency per a predetermined unit time and reduce the rate of use of memory when similar processing is realized.

As has been explained above, according to the above described embodiments, it is possible to carry out a plurality of processes on a time-division basis within 1 vertical synchronization period and thereby provide an image sensing apparatus capable of transmitting motion images with a low delay in real time to a plurality of display apparatuses. Especially within a closed network not using the Internet, there is almost no influence of time delays in network transmission, and therefore it is possible to realize more real-time transmission of motion images compared to a conventional image delivery system by way of a server.

Furthermore, the image sensing apparatus 5 of each embodiment can directly execute image correction processing on a non-compressed motion image. For this reason, it is possible to realize a delivery of motion images subjected to high quality image processing for a system using a server which expands a compressed or analog-processed image or converts it to a digital signal and then subjects the image to image processing.

Furthermore, the image sensing apparatus 5 of each embodiment can apply different image correction processes and encoding processes to a plurality of different display apparatuses and transmit motion images. For this reason, it is possible to transmit motion images according to characteristics of a display apparatus and arbitrary operations/settings of a user who watches the display apparatus.

Furthermore, the image sensing apparatus 5 of each embodiment can change the number of processes within 1 vertical synchronization period according to the number of display apparatuses connected and contents of the requested processes. In such a case, it is possible to save power by operating at a smaller frequency when the number of processes is small or operating at a higher frequency when the number of processes is large.

Furthermore, the image sensing apparatus 5 of each embodiment provides storage means inside or outside the image sensing apparatus, and can thereby extract an arbitrary angle of view and deliver motion images subjected to image correction according to requests from an outside display apparatus while storing basic motion images.

Furthermore, the image sensing apparatus 5 of each embodiment can transmit a plurality of motion images without mounting a plurality of the same processing units in parallel, reduce the area of a substrate or chip area and reduce power consumption, etc., and can thereby consequently provide a small network camera.

Furthermore, the image sensing apparatus 5 according to the Sixth and Seventh Embodiments can supply data to a plurality of processing units without passing through a memory simultaneously and transfer motion images subjected to a plurality of processes at a lower frequency, thus realizing power saving.

Furthermore, the image sensing apparatus 5 according to the Sixth and Seventh Embodiment allows the same data to be supplied to a plurality of processing units without passing through any memory. For this reason, it is possible to easily increase the number of processes within 1 vertical synchronization period and transfer motion images corresponding to more network requests.

Furthermore, the image sensing apparatus 5 according to the Sixth and Seventh Embodiment allows the same data to be supplied to a plurality of encoding processing units without passing through any memory. For this reason, it is possible to increase the number of encoding processes within 1 vertical synchronization period and transfer motion images corresponding to more network requests.

The present invention may be applicable to a system made up of a plurality of devices (e.g., host computer, interface device, reader, printer, etc.) or may also be applicable to an apparatus made up of one device (e.g., copier, facsimile apparatus, etc.).

Furthermore, it goes without saying that the object of the present invention can also be attained by supplying a storage medium in which program code of software for implementing the functions of the aforementioned embodiments is recorded to a system or apparatus and by the computer (or CPU, MPU) of the system or apparatus reading and executing the program code stored in the storage medium.

In this case, the program code read from the storage medium implements the functions of the aforementioned embodiments and the storage medium storing the program code constitutes the present invention.

As the storage medium for supplying the program code, for example, a floppy disk, hard disk, optical disk, magneto-optical disk, CD-ROM, CD-R, magnetic tape, non-volatile memory card, ROM, etc., can be used.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2004-264595 filed on Sep. 10, 2004, and No. 2005-211532 filed on Jul. 21, 2005 which are hereby incorporated by reference herein.

What is claimed is:

1. A data processing apparatus comprising:
a plurality of image processing processors configured to execute different processes on image data;
an encoding processor configured to encode the image data; and
a generation processor configured to cause at least one of said plurality of image processing processors to process the image data of each frame and cause said encoding processor to encode the processed image data to thereby generate image data that meet the requests from the plurality of output destinations, one of the plurality of image processing processors corresponding to a common process included in requests from the plurality of output destinations executes the common process on image data, then processors are selected from among the plurality of image processing processors and the encoding processor so as to execute processes other than the common process which are included in each of the requests, and the selected processors execute the processes other than the common process in parallel on the image data that has been processed by the common process.

2. The apparatus according to claim 1, further comprising a transmission unit configured to transmit the plurality of encoded data generated by said generation processor to the plurality of output destinations respectively.

3. The apparatus according to claim 1, further comprising an image sensing unit configured to generate the image data.

4. The apparatus according to claim 1, wherein when one of the output destinations requests a plurality of processes to be processed by the plurality of image processing processors, first one of the plurality of image processing processors stores in a memory the image data processed by the first one of the image processing processors, second one of the plurality of image processing processors processes the image data stored in the memory, and the encoding processor encodes the image data processed by the second one of the plurality of image processing processors.

5. The apparatus according to claim 1, wherein the plurality of image processing processors stores in a memory the image data processed by said at least one of the plurality of image processing processors, and the encoding processor reads a partial image from the image data stored in the memory and encodes the image data read from the memory.

6. The apparatus according to claim 4, wherein the second one of the plurality of image processing processors processes the image data stored in the memory a plurality of times based on the requests from the plurality of output destinations.

7. The apparatus according to claim 1, wherein said at least one of the image processing processors processes the input image data sent by a demultiplexer.

8. The apparatus according to claim 1, wherein the plurality of image processing processors are connected in series so as to enable pipeline processing and non-selected image processing processor allows data to be passed through.

9. The apparatus according to claim 8, wherein a flag indicating a selection/non-selection of the plurality of image processing processors is added to image data and each of image processing processors references the flag to determine whether or not to execute processing.

10. The apparatus according to claim 8, further comprising a setting unit configured to set a selected/non-selected state in the plurality of image processing processors based on the requests from the output destinations.

11. A data processing apparatus comprising:
a plurality of image processing processors configured to execute different processes on image data;
an encoding processor configured to encode the image data;
a concurrent output processor configured to supply the same image data to processors selected from among said plurality of image processing processors and said encoding processor; and
a generation processor configured to cause said concurrent output processor to supply said image data of each frame to processors selected from among said plurality of image processing processors and said encoding processor so as to carry out image processing and encoding processing simultaneously on the same data which is processed by one of the plurality of image processing processors to generate image data that meet the requests from the plurality of output destinations, wherein one of the plurality of image processing processors corresponding to a common process included in requests from the plurality of output destinations executes the common process on image data, then processors are selected from among the plurality of image processing processors and the encoding processor so as to execute processes other than the common process which are included in each of the requests, and the selected processors execute the processes other than the common process in parallel on the image data that has been processed by the common process.

12. The apparatus according to claim 11, further comprising a transmission unit configured to connect a plurality of encoding units to said concurrent output unit and thereby transmitting a plurality of encoded data to said plurality of output destinations.

13. The apparatus according to claim 11, further comprising a plurality of different image data input/output units in an image data input/output system of said plurality of image processing unit and said encoding unit.

14. The apparatus according to claim 11, wherein said concurrent output processor comprises a storage unit configured to store output data from said plurality of image processing processors and said encoding processor and outputs data in processing block units in said storage unit according to requests from said plurality of image processing processors and said encoding processor output simultaneously.

15. The apparatus according to claim 11, wherein said concurrent output processor comprises a port connection control unit configured to connect output signal ports of said plurality of image processing processors and said encoding processor and a plurality of input signal ports in said plurality of image processing processors and said encoding processor to which data is input simultaneously.

16. A data processing apparatus control method, comprising:
a plurality of image processing steps of executing different processes on image data, said image processing steps performed by one or more processors;
an encoding step, performed by one or more processors, of encoding the image data; and
a generation step, performed by one or more processors, of causing the plurality of image processing steps to process the image data of each frame and causing said encoding step to encode the processed image data to thereby generate image data that meet the requests from the plurality of output destinations, wherein a common process included in requests from the plurality of output destinations is executed on image data in one of the plurality of image processing steps which corresponds to the common process, and then processes other than the common process which are included in each of the requests are performed in parallel on the image data that have been processed by the common process in steps selected from among the plurality of image processing steps and the encoding step.

17. A computer readable storage medium storing a computer program for causing a computer to execute the control method according to claim 16.

18. The apparatus according to claim 1, wherein the plurality of image processing units concurrently processes the input image data of a frame.

19. An image data processing apparatus comprising:
a processing processor configured to process image data of one frame based on requests from a plurality of output destinations; and
an encoding processor configured to encode the image data of the one frame output from the processing processor based on the requests from the plurality of output destinations,
wherein the processing processor executes a common process included in requests from the plurality of output destinations on image data, and then processes other than the common process which are included in each of the requests are performed in parallel on the image data that have been processed by the common process.

20. The apparatus according to claim 19, wherein the processing processor processes the input image data of one frame a plurality of times based on requests from a plurality of output destinations during a period when the image data of the one frame is input.

21. The apparatus according to claim 19, further comprising a plurality of processing processors configured to process the input image data of the one frame based on requests from the plurality of output destinations.

22. The apparatus according to claim 21, wherein the plurality of processing processors processes the input image data of the one frame in parallel based on requests from the plurality of output destinations.

23. The apparatus according to claim 21, wherein the plurality of processing processors processes the input image data of the one frame in time-series based on requests from the plurality of output destinations.

24. The apparatus according to claim 19, wherein the processing processor corrects luminance of the input image data of the one frame a plurality of times based on requests from a plurality of output destinations.

25. The apparatus according to claim 19, wherein the processing processor performs cooler conversion on the input image data of the one frame a plurality of times based on requests from a plurality of output destinations.

26. A method for controlling an image data processing, the method comprising:

processing with one or more processors image data of one frame based on requests from a plurality of output destinations; and encoding with one or more processors the image data of the one frame processed in the processing step based on the requests from the plurality of output destinations, wherein a common process included in requests from the plurality of output destinations is executed on image data in one of the plurality of image processing steps which corresponds to the common process, and then processes other than the common process which are included in each of the requests are performed in parallel on the image data that have been processed by the common process.

27. The method according to claim 26, wherein the processing step processes the input image data of one frame a plurality of times based on requests from a plurality of output destinations during a period when the image data of the one frame is input by an input unit.

28. The method according to claim 26, further comprising a plurality of processing steps each of which processes differently the input image data of the one frame based on requests from the plurality of output destinations.

29. The method according to claim 28, wherein the plurality of processing steps process the input image data of the one frame in parallel based on requests from the plurality of output destinations.

30. The method according to claim 28, wherein the plurality of processing steps process the input image data of the one frame in time-series based on requests from the plurality of output destinations.

31. The method according to claim 26, wherein the processing step corrects luminance of the input image data of the one frame a plurality of times based on requests from a plurality of output destinations.

32. The method according to claim 26, wherein the processing step performs cooler conversion on the input image data of the one frame a plurality of times based on requests from a plurality of output destinations.

33. The method according to claim 26, wherein processes corresponding to the requests from the plurality of output destinations finish in one frame period.

34. The method according to claim 26, wherein the image data is processed in an order of the requests from the plurality of output destinations.

35. The apparatus according to claim 19, wherein processes corresponding to the requests from the plurality of output destinations finish in one frame period.

36. The apparatus according to claim 19, wherein the image data is processed in an order of the requests from the plurality of output destinations.

* * * * *